US010564530B2

(12) United States Patent
Suzuki et al.

(10) Patent No.: US 10,564,530 B2
(45) Date of Patent: Feb. 18, 2020

(54) PROJECTOR WITH HOMOGENIZED COOLING OF LIGHT SOURCE ARRAY

(71) Applicant: SEIKO EPSON CORPORATION, Tokyo (JP)

(72) Inventors: Takahiro Suzuki, Matsumoto (JP); Takahiro Miyata, Matsumoto (JP); Makoto Zakoji, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/169,246

(22) Filed: Oct. 24, 2018

(65) Prior Publication Data

US 2019/0121225 A1    Apr. 25, 2019

(30) Foreign Application Priority Data

Oct. 25, 2017    (JP) ................. 2017-206606

(51) Int. Cl.
*G03B 21/16* (2006.01)
*G03B 21/20* (2006.01)
(Continued)

(52) U.S. Cl.
CPC .............. *G03B 21/16* (2013.01); *F21V 29/52* (2015.01); *F21V 29/83* (2015.01);
(Continued)

(58) Field of Classification Search
CPC ...... G03B 21/16; G03B 21/20; G03B 21/145; G03B 21/2013; G03B 21/2033;
(Continued)

(56) References Cited

U.S. PATENT DOCUMENTS 9,778,552 B2    10/2017  Yamaguchi
2005/0157269 A1*  7/2005  Seto ................. G03B 21/16
                                      353/61

(Continued)

FOREIGN PATENT DOCUMENTS

JP    2005-338251 A    12/2005
JP    2008-89917 A     4/2008

(Continued)

*Primary Examiner* — Sultan Chowdhury

(74) *Attorney, Agent, or Firm* — Oliff PLC

(57) ABSTRACT

A projector includes a light source device and a cooling device. The light source device includes a first light source having a plurality of first light emitting elements, a second light source having a plurality of second light emitting elements, and a light combining member adapted to combine light. The cooling device includes a first cooling section adapted to cool the first light emitting elements with a liquid refrigerant so that a first temperature difference increases in a first direction, and a second cooling section adapted to cool the second light emitting elements with a liquid refrigerant so that a second temperature difference increases in a second direction. The first and second light sources are arranged so that an illuminance distribution caused by the first temperature difference and an illuminance distribution caused by the second temperature difference are canceled out in the light combining member.

13 Claims, 18 Drawing Sheets

(51) Int. Cl.
*F21V 29/52* (2015.01)
*F21V 29/83* (2015.01)
*H05B 33/08* (2020.01)
*F21V 29/60* (2015.01)

(52) U.S. Cl.
CPC ..... *G03B 21/2013* (2013.01); *G03B 21/2033* (2013.01); *H05B 33/0851* (2013.01); *F21V 29/60* (2015.01)

(58) Field of Classification Search
CPC .......... F21V 29/15; F21V 29/52; F21V 29/54; F21V 29/83; H01L 23/34; H01L 23/427
See application file for complete search history.

(56) References Cited

U.S. PATENT DOCUMENTS

| | | |
|---|---|---|
| 2013/0214997 A1 | 8/2013 | Kanno |
| 2014/0043374 A1 | 2/2014 | Yanai |
| 2016/0254643 A1* | 9/2016 | Takigawa ............ H01S 5/02407 372/34 |
| 2017/0059973 A1 | 3/2017 | Yamaguchi |

FOREIGN PATENT DOCUMENTS

| | | |
|---|---|---|
| JP | 2008-102304 A | 5/2008 |
| JP | 2008-192579 A | 8/2008 |
| JP | 2008-268616 A | 11/2008 |
| JP | 2009-31557 A | 2/2009 |
| JP | 2013-073068 A | 4/2013 |
| JP | 2013-167774 A | 8/2013 |
| JP | 2014-035376 A | 2/2014 |
| JP | 2017-45002 A | 3/2017 |

\* cited by examiner

PROJECTOR WITH HOMOGENIZED COOLING OF LIGHT SOURCE ARRAY

BACKGROUND

1. Technical Field

The present invention relates to a projector.

2. Related Art

In the past, there has been known a projector which modulates light emitted from a light source to form and then project an image corresponding to image information. As such a projector, there is known a projector in which a liquid refrigerant is made to flow to cool a light source (see, e.g., JP-A-2008-89917 (Document 1)).

The projector (a projection type video display device) described in Document 1 is provided with a red LED, a green LED and a blue LED each functioning as a light source, and a cooler for cooling these LED. Among these constituents, the cooler is provided with a heat conducting section coupled to each of the LED, a radiator, and a pump for circulating the liquid refrigerant between the heat conducting section and the radiator. Further, the heat transferred from the LED to the liquid refrigerant in the heat conducting section is radiated in the radiator through which the liquid refrigerant flows, and thus, each of the LED is cooled.

In the projector described in Document 1 mentioned above, the red LED, the green LED, and the blue LED are each formed of a plurality of LED, and can therefore each be called an LED array. In such an LED array, the LED disposed on the peripheral side are easy to have contact with an ambient gas relatively low in temperature, and are therefore apt to drop in temperature, but the LED disposed on the central side are relatively apt to rise in temperature. Therefore, a temperature difference is apt to occur between the LED in the LED array.

In this regard, in the projector described in Document 1 mentioned above, a liquid refrigerant is made to flow to cool each of the LED arrays. However, since the heat of the LED is transferred to such a liquid refrigerant to make the liquid refrigerant rise in temperature as the liquid refrigerant flows, the LED located on the upstream side of the liquid refrigerant are easy to cool, while the LED located on the downstream side are hard to cool. Therefore, it is difficult to homogenize the temperature of the LED arranged in the LED array.

Further, a solid-state light source such as an LED has a characteristic that the emission luminance is low at high temperature and is high at low temperature.

According to these circumstances, it is difficult to emit a light beam having an even luminance distribution from the LED array cooled by the liquid refrigerant, and in the projector having the LED array, there is a problem that a deterioration such as a luminance variation is apt to occur in the image formed. In particular, in the projectors equipped with a light source having a larger number of solid-state light sources arranged, the problem described above becomes more conspicuous.

SUMMARY

An advantage of some aspects of the invention is to provide a projector capable of preventing a deterioration of an image to be projected.

A projector according to an aspect of the invention includes a light source device, a light modulation device adapted to modulate light emitted from the light source device, a projection optical device adapted to project the light modulated by the light modulation device, and a cooling device adapted to cool the light source device, the light source device includes a first light source in which a plurality of first light emitting elements are arranged, a second light source in which a plurality of second light emitting elements are arranged, and a light combining member adapted to combine light emitted from the first light source and light emitted from the second light source with each other, the cooling device includes a first cooling section adapted to cool the plurality of first light emitting elements with a liquid refrigerant flowing through a flow channel formed inside so that a temperature difference increases in a first direction, and a second cooling section adapted to cool the plurality of second light emitting elements with a liquid refrigerant flowing through a flow channel formed inside so that a temperature difference increases in a second direction, and the first light source and the second light source are arranged so that an illuminance distribution caused by the temperature difference of the plurality of first light emitting elements and an illuminance distribution caused by the temperature difference of the plurality of second light emitting elements are canceled out in the light combining member.

According to such a configuration, since the first cooling section cools the plurality of first light emitting elements so that the temperature difference increases in the first direction, the light beam emitted from the first light source becomes the light beam having the illuminance distribution varying in the first direction. Further, since the second cooling section cools the plurality of second light emitting elements so that the temperature difference increases in the second direction, the light beam emitted from the second light source becomes the light beam having the illuminance distribution varying in the second direction. Further, the first light source and the second light source are arranged so that the illuminance distributions of the light beams emitted from the respective light sources are canceled out each other in the light combining member. Therefore, it is possible to obtain the light beam emitted from these light sources and then combined by the light combining member as the light beam having a roughly homogenized illuminance distribution (luminance distribution). Therefore, it is possible to prevent the luminance variation from occurring in the projection image formed by modulating such a light beam, and it is possible to prevent the projection image from deteriorating.

In the aspect of the invention described above, it is preferable that the first cooling section is disposed so that the flow channel of the first cooling section overlaps the plurality of first light emitting elements when viewed from an opposite side to an emission side of the light emitted by the first light source, and the second cooling section is disposed so that the flow channel of the second cooling section overlaps the plurality of second light emitting elements when viewed from an opposite side to an emission side of the light emitted by the second light source.

According to such a configuration, it is possible to make it easy to transfer the heat generated in the plurality of first light emitting elements to the liquid refrigerant flowing through the flow channel in the first cooling section, and further, it is possible to make it easy to transfer the heat generated in the plurality of second light emitting elements to the liquid refrigerant flowing through the flow channel in the second cooling section. Therefore, it is possible to effectively cool the plurality of first light emitting elements and the plurality of second light emitting elements.

In the aspect of the invention described above, it is preferable that the first cooling section causes the temperature difference in the first direction due to the flow channel of the first cooling section, and the second cooling section causes the temperature difference in the second direction due to the flow channel of the second cooling section.

According to such a configuration, it is possible to cause the temperature difference described above with the flow channel of the liquid refrigerant. Therefore, it is possible to reliably generate the illuminance distributions described above in the light beams respectively emitted from the first light source and the second light source.

In the aspect of the invention described above, it is preferable that at least one of the first cooling section and the second cooling section includes an inflow section adapted to inflow the liquid refrigerant flowing in the at least one cooling section, an outflow section adapted to outflow the liquid refrigerant having flowed in the at least one cooling section, and a flow channel forming section adapted to form a flow channel meandering from the inflow section toward the outflow section.

According to such a configuration, since the flow channel of the liquid refrigerant is meandering, it is possible to elongate the flow channel of the liquid refrigerant. Thus, it is possible to generate the temperature difference of the liquid refrigerant, namely a difference in cooling efficiency by the liquid refrigerant, between the upstream side and the downstream side of the flow channel, and by extension, it is possible to generate temperature difference of the light emitting elements. Further, since the temperature difference increases in a direction from the inflow section toward the outflow section, it is possible to reliably generate the temperature difference described above. Therefore, it is possible to cause the illuminance distribution in the light beam emitted from the light source cooled by the at least one cooling section described above out of the first light source and the second light source. Further, by arranging the first light source and the second light source as described above, it is possible to emit the light beam having the roughly homogenized illuminance distribution from the light source device, and it is possible to prevent the deterioration from occurring in the projection image.

In the aspect of the invention described above, it is preferable that the flow channel forming section reverses a flow direction of the liquid refrigerant an odd number of times no smaller than three times.

Here, in the case in which the number of reversals (the number of times of folding) of the flow direction of the liquid refrigerant is an even number, the position of the inflow section and the position of the outflow section become on the sides opposite to each other in the flow direction.

In contrast, by setting the number of reversals to an odd number, it is possible to locate the position of the inflow section and the position of the outflow section on the same side in the flow direction. Therefore, piping to the cooling section can easily be achieved.

In the aspect of the invention described above, it is preferable that there are further included a temperature detection section adapted to detect temperature of the first light source and temperature of the second light source, and a lighting control section adapted to supply the first light source and the second light source with a drive current to light the first light source and the second light source, and in a case in which at least one of the temperature of the first light source and the temperature of the second light source is lower than a predetermined value, the lighting control section supplies the at least one light source with the drive current lower in current value than the drive current supplied to a light source in a case in which the temperature of the light source is equal to or higher than the predetermined value.

Here, as described above, in the light emitting elements, the emission luminance drops at high temperature, and rises at low temperature. Therefore, if the light emitting elements continue to light to rise in temperature, the light intensity of the light beams emitted from the first light source and the second light source drops, and by extension, the luminance of the projection image drops.

Further, the light emitting elements varies in emission luminance with the current value of the drive current supplied.

In contrast, in the case in which the temperature is low, by supplying the at least one light source with the drive current lower in current value than the drive current to be supplied to the at least one light source in the case in which the temperature is high, the variation of the emission luminance of the light emitting element due to the temperature change can be suppressed by the change of the current value described above. Therefore, since it is possible to keep the light intensity of the light beam emitted from the at least one light source described above roughly constant, it is possible to suppress the luminance variation in the projection image.

In the aspect of the invention described above, it is preferable that there is further included a metal housing to which the first light source and the second light source are fixed, and the first cooling section and the second cooling section are insulated as insulation targets from the metal housing.

Here, in the electronic apparatus such as a projector, an electromagnetic wave is generated from the control device or the power supply device disposed inside. If the electromagnetic wave is propagated to the metal member connected to the ground, a current flows through the metal member in some cases. If a liquid flows through such a metal member, corrosion occurs on the interface with the liquid in some cases, and the corrosion becomes a factor for a leak.

In contrast, the first cooling section and the second cooling section are insulated as the insulation target from the metal housing. According to this configuration, even in the case in which the electromagnetic wave described above has been propagated, it is possible to prevent the current from flowing through the first cooling section and the second cooling section. Therefore, it is possible to prevent the corrosion described above from occurring, and thus, it is possible to prevent a problem such as a leak from occurring.

In the aspect of the invention described above, it is preferable that there is further included a flow-dividing part provided on the metal housing, the flow-dividing part adapted to divide flow of the liquid refrigerant flowing inside to flow into the first cooling section and the second cooling section, and the flow-dividing part is insulated as the insulation target from the metal housing.

According to such a configuration, since the corrosion described above can be prevented from occurring in the flow-dividing part, it is possible to prevent the leak from occurring in the flow-dividing part relatively high in flow rate of the liquid refrigerant.

In the aspect of the invention described above, it is preferable that there is further included a junction part provided on the metal housing, the injunction part adapted to merge the liquid refrigerant having flowed through the first cooling section and the liquid refrigerant having flowed through the second cooling section with each other, and the junction part is insulated as the insulation target from the metal housing.

According to such a configuration, similarly to the flow-dividing part, it is possible to prevent the leak from occurring in the junction part relatively high in flow rate of the liquid refrigerant.

In the aspect of the invention described above, it is preferable that there is further included a heat exchanger disposed inside the metal housing, the heat exchanger adapted to transfer heat of a gas inside the metal housing to the liquid refrigerant flowing inside to cool the gas, and the heat exchanger is insulated as the insulation target from the metal housing.

According to such a configuration, since it is possible to prevent the corrosion from occurring in the heat exchanger, it is possible to prevent the leak from occurring in the heat exchanger, and by extension, it is possible to prevent the liquid refrigerant form being leaked in the metal housing. Further, since the corrosion described above can be prevented from occurring, it is possible to prevent the choke from occurring in the heat exchanger, and thus it is possible to prevent the deterioration of the performance of the heat exchanger.

In the aspect of the invention described above, it is preferable that a first insulating member is disposed between the metal housing and the insulation target through which the liquid refrigerant flows, the insulation target insulated from the metal housing.

According to such a configuration, it is possible to reliably insulate the insulation target from the metal housing. Therefore, it is possible to reliably prevent the corrosion from occurring in the insulation target.

In the aspect of the invention described above, it is preferable that the insulation target is attached to the metal housing with an attachment member, and a second insulating member is disposed between the attachment member and the insulation target.

It should be noted that as the attachment member, there can be cited a screw.

Here, in the case in which the attachment member is a metal member, there is a possibility that the metal housing and the insulation target are electrically connected to each other via the attachment member.

In contrast, according to the configuration described above, by disposing the second insulating member between the attachment member and the insulation target, it is possible to prevent the metal housing and the insulation target from being electrically connected via the attachment member. Therefore, it is possible to reliably insulate the insulation target from the metal housing.

In the aspect of the invention described above, it is preferable that the metal housing has a positioning projection adapted to position the insulation target, the insulation target has a positioning hole through which the positioning projection is inserted, and a third insulating member is disposed between the positioning projection and an inner surface of the positioning hole.

According to such a configuration, it is possible to prevent the metal housing and the insulation target from being electrically connected to each other via the positioning projection. Therefore, it is possible to reliably insulate the insulation target from the metal housing.

BRIEF DESCRIPTION OF THE DRAWINGS

The invention will be described with reference to the accompanying drawings, wherein like numbers reference like elements.

DESCRIPTION OF AN EXEMPLARY EMBODIMENT

An embodiment of the invention will hereinafter be described based on the accompanying drawings.

Schematic Configuration of Projector

Figure 1:
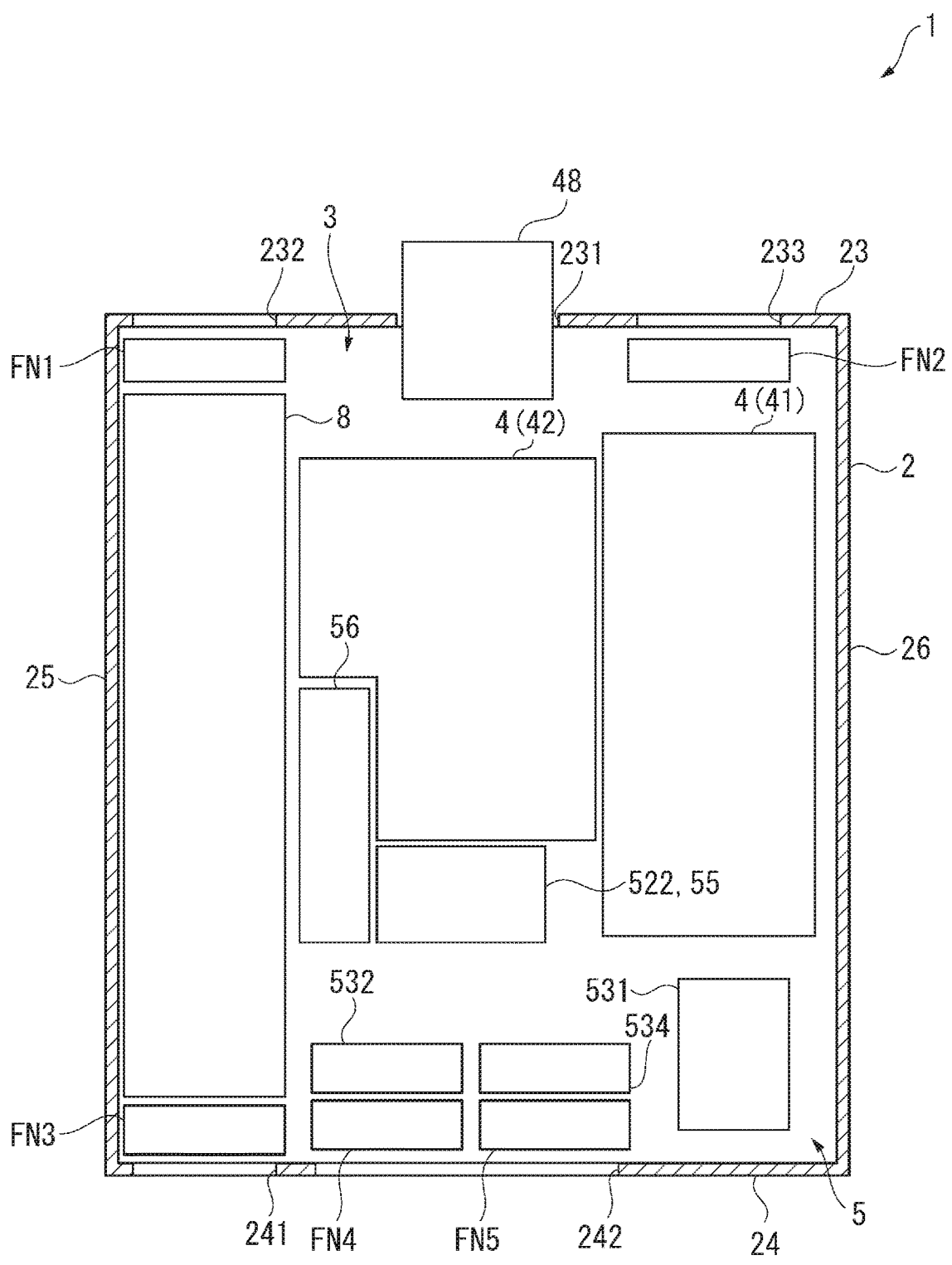
FIG. 1 is a schematic diagram showing a configuration of a projector according to an embodiment of the invention.

FIG. 1 is a schematic diagram showing a configuration of a projector 1 according to the present embodiment.

The projector 1 according to the present embodiment is a projection type display device for modulating the light emitted from a light source device 41 to thereby from an image corresponding to image information, and then projecting the image on a projection target surface such as a screen in an enlarged manner. As shown in FIG. 1, the projector 1 is provided with an exterior housing 2 forming an exterior, and a device main body 3 housed in the exterior housing 2.

Although described later in detail, such a projector 1 has one of the features in an arrangement of a light source, and a configuration of a cooling device 5 for cooling a cooling target.

Hereinafter, the configuration of the projector 1 will be described in detail.

Configuration of Exterior Housing

The exterior housing 2 is formed to have a roughly rectangular solid shape. The exterior housing 2 has a front surface part 23, a back surface part 24, a right side surface part 25 (a side surface part located on the right side viewed from the front surface part 23 side), and a left side surface part 26 (a side surface part located on the left side viewed from the front surface part 23 side), and in addition has a top surface part for connecting one end side of these surface parts 23 through 26 and a bottom surface part for connecting the other end side of these surface parts 23 through 26, although not shown in the drawings. It should be noted that the bottom surface part has a plurality of legs capable of having contact with an installation surface of the projector 1.

The front surface part 23 has an opening section 231 for exposing a part of a projection optical device 48 described later, and an introduction ports 232, 233 located so as to be shifted toward the left side surface 26 and the right side surface 25, respectively, with respect to the opening section 231 and taking a gas located outside the exterior housing 2 inside as a cooling gas.

The back surface part 24 has discharge ports 241, 242 for discharging the gas having circulated inside the exterior housing 2 to the outside of the exterior housing 2. Among these, the discharge port 241 is located closer to the right side surface part 25 in the back surface part 24, and the discharge port 242 is located closer to the left side surface part 26.

It should be noted that in the following description, among a +Z direction, a +X direction and a +Y direction perpendicular to each other, the +Z direction is defined as a direction from the back surface part 24 toward the front surface part 23. Further, the +X direction is defined as a direction from the left side surface part 26 toward the right side surface part 25, and the +Y direction is defined as a direction from the bottom surface part toward the top surface part. In other words, the +Z direction is a direction from the lower side toward the upper side in the view shown in FIG. 1, the +X direction is a direction from the right side toward the left side, and the +Y direction is a direction from a back side toward the front side. Further, although not shown in the drawings, an opposite direction to the +Z direction is defined as a −Z direction. The same applies to a −X direction and a −Y direction. It should be noted that in the following description, the +Z direction, the +X direction and the +Y direction are defined as directions (perpendicular directions) perpendicular to each other.

Configuration of Device Main Body

The device main body 3 is an internal constituent of the projector 1 housed in the exterior housing 2. The device main body 3 is provided with an image projection device 4, the cooling device 5, and a power supply device 8. Besides the above, although not shown in FIG. 1, the device main body 3 is provided with a control device 9 (see FIG. 12) for controlling an operation of the projector 1.

Among these constituents, the power supply device 8 is disposed along the right side surface section 25 inside the exterior housing 2. The power supply device 8 transforms the voltage supplied from the outside to supply the result to each of electronic components constituting the projector 1.

Configuration of Image Projection Device

Figure 2:
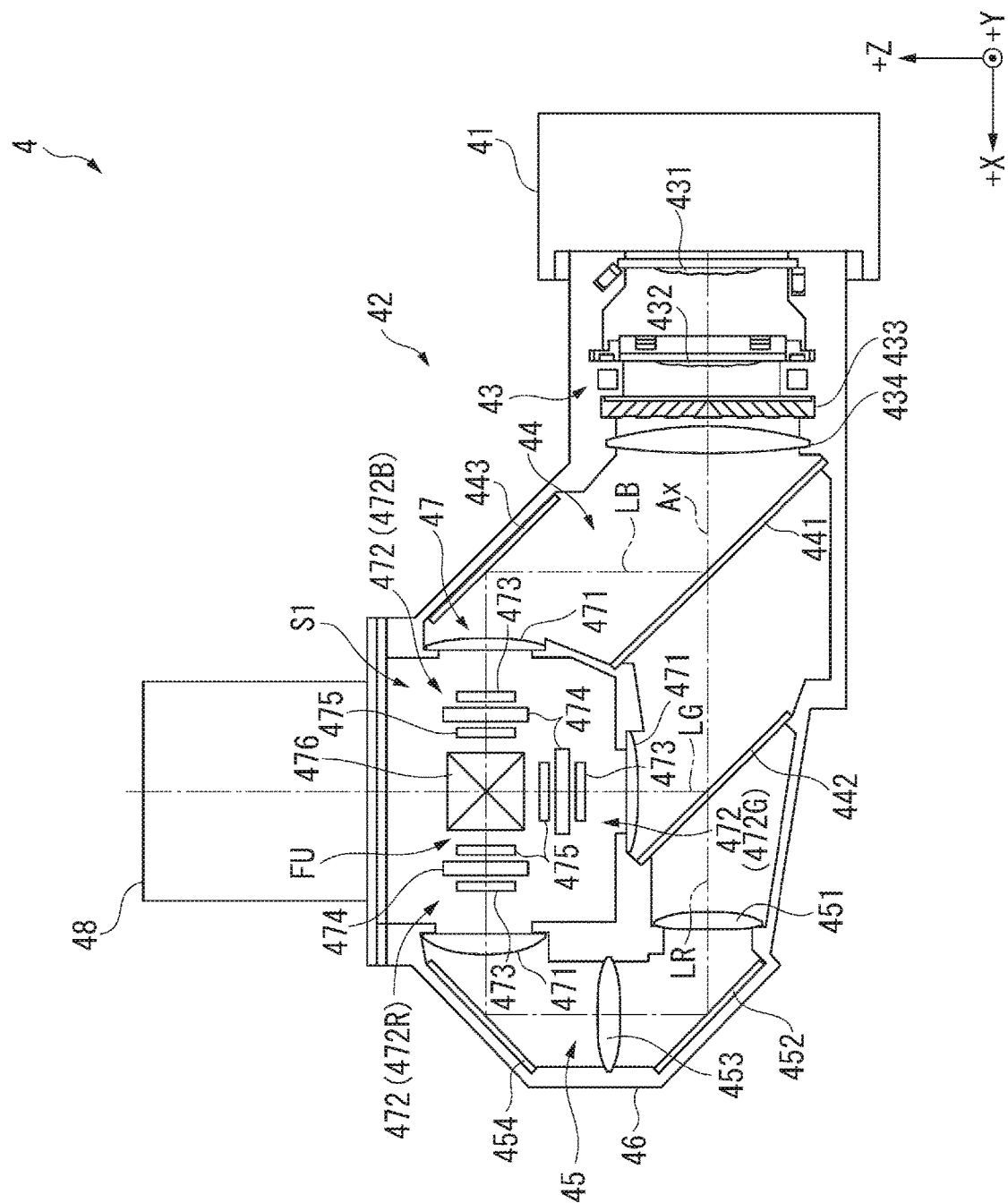
FIG. 2 is a schematic diagram showing a configuration of an image projection device in the embodiment mentioned above.

FIG. 2 is a schematic diagram showing a configuration of the image projection device 4.

The image projection device 4 is for forming and then projecting an image corresponding to image information input from the control device 9 mentioned above, and is disposed on the +Z direction side and the −X direction side inside the exterior housing 2. As shown in FIG. 2, the image projection device 4 has a light source device 41, an image forming device 42 and a projection optical device 48.

Configuration of Light Source Device

Figure 3:
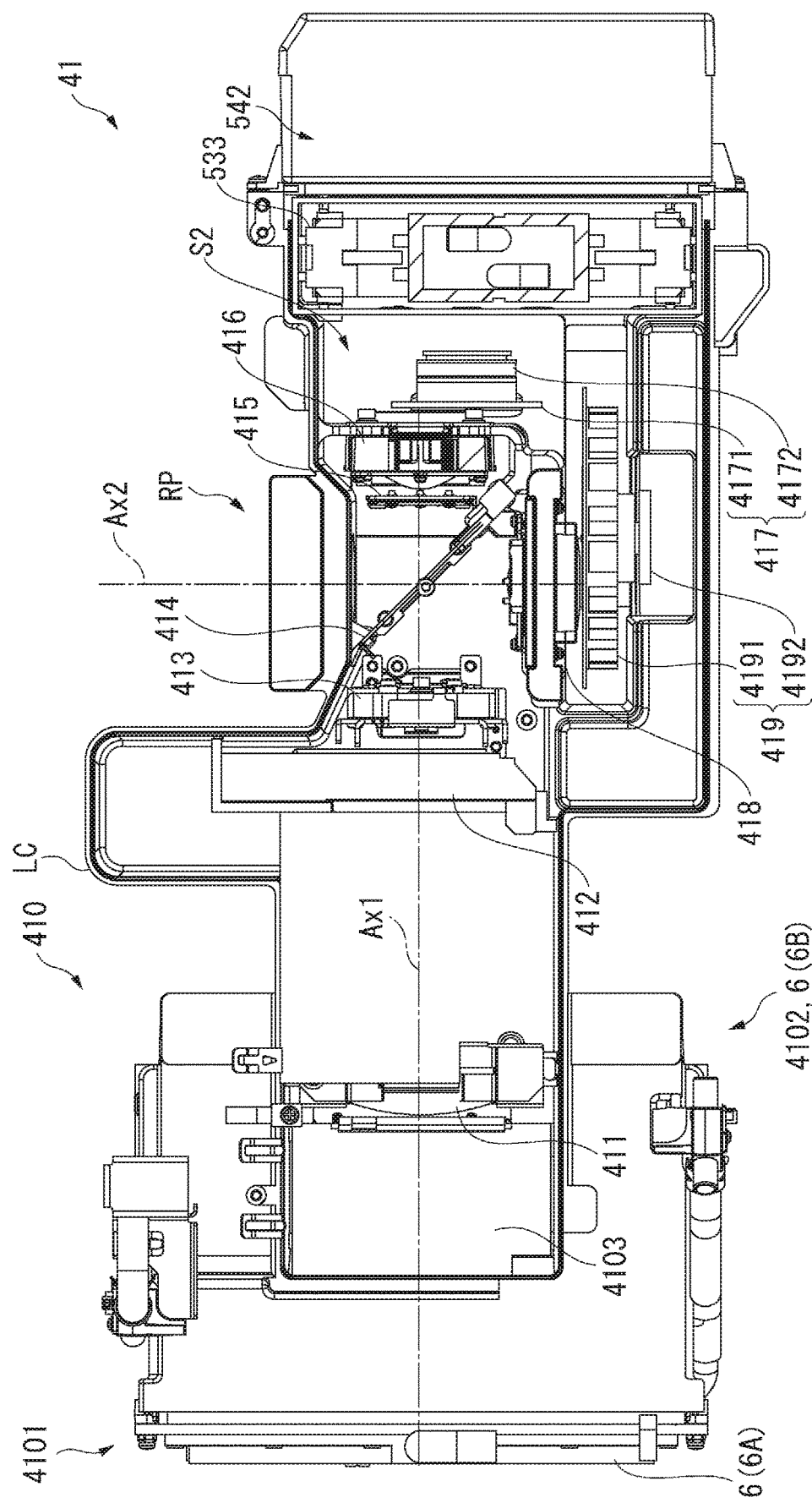
FIG. 3 is a plan view showing a light source device in the embodiment mentioned above.

FIG. 3 is a plan view (a diagram viewed from the +Y direction side) showing the light source device 41. It should be noted that in FIG. 3, regarding the light source housing LC constituting the light source device 41, there is shown the light source device 41 in the state in which a lid member of the light source housing LC is removed.

The light source device 41 emits illumination light including red light, green light, and blue light to the image forming device 42. As shown in FIG. 3, the light source device 41 is provided with the light source housing LC, and a light source section 410, an a focal optical element 411, a first retardation element 412, a homogenizer optical element 413, a light combining element 414, a second retardation element 415, a first light collecting element 416, a light diffusion element 417, a second light collecting element 418, a wavelength conversion device 419 and a third retardation element RP each attached to the light source housing LC.

The light source housing LC is a metal housing forming a second space S2 inside, the second space S2 being roughly sealed. Inside the light source housing LC, there are disposed the constituents 411 through 419, RP described above. More specifically, the light source housing LC houses and holds the constituents 411 through 419, RP described above inside, the constituents 411 through 419, RP described above corresponding to optical elements acting on the light emitted from the light source section 410. Further, the light source section 410 is attached to the light source housing LC so as to be partially exposed outside the light source housing LC.

Further, the light source section 410, the a focal optical element 411, the first retardation element 412, the homogenizer optical element 413, the second retardation element 415, the first light collecting element 416 and the light diffusion device 417 are disposed on a first illumination optical axis Ax1 set in the light source housing LC. In contrast, the second light collecting element 418, the wavelength conversion device 419, and the third retardation element RP are disposed on a second illumination optical axis 2 similarly set in the light source housing LC, and crossing the first illumination optical axis Ax1. On an extended line of the second illumination optical axis Ax2, there is disposed a homogenizing device 43 described later.

Further, the light combining element 414 is disposed in a crossing part between the first illumination optical axis Ax1 and the second illumination optical axis Ax2.

Configuration of Light Source Section

The light source section 410 emits source light. The light source section 410 has a first light source 4101, a second light source 4102 and a light combining member 4103. The first light source 4101 and the second light source 4102 are each fixed to the light source housing LC as the metal housing.

The first light source 4101 is attached to the light source housing LC so that the light emission surface is located along the X–Y plane, and faces to the +Z direction, and emits the source light toward the +Z direction.

The second light source 4102 is attached to the light source housing LC so that the light emission surface is located along the X–Z plane, and faces to the +Y direction, and emits the source light toward the +Y direction.

The light combining member 4103 combines the source light having been emitted from the first light source 4101 toward the +Z direction and the source light having been emitted from the second light source 4102 toward the +Y direction with each other, and then emits the result toward the +Z direction. As such a light combining member 4103, there can be cited a stripe mirror.

Among these constituents, the first light source 4101 and the second light source 4102 will be described later in detail.

Configuration of A Focal Optical Element

The a focal optical element 411 reduces the diameter of the source light entering the a focal optical element 411 from the light source section 410, and then collimates and then emits the result. As such an a focal optical element 411, there can be cited a combination of a convex lens for reducing the diameter of the source light, and a concave lens for collimating the source light having passed through the convex lens.

Configuration of First Retardation Element

Although the detailed illustration is omitted, the first retardation element 412 has a quarter-wave plate and a rotary device.

The quarter-wave plate converts a part of the source light as the s-polarized light entering the quarter-wave plate from the a focal optical element 411 into the source light as the p-polarized light to thereby convert the part into the source light having the s-polarized light and the p-polarized light mixed with each other.

The rotary device rotates the quarter-wave plate around a rotational axis parallel to the first illumination optical axis Ax1 to control the proportion between the s-polarized light and the p-polarized light included in the source light having passed through the quarter wave plate. Thus, in the source light emitted from the first retardation element 412, the light intensity ratio between the source light as the p-polarized light entering the light diffusion device 417 described later and the source light as the s-polarized light entering the wavelength conversion device 419 described later is adjusted, and thus the white balance of the illumination light to be emitted from the light source device 41 is adjusted.

Configuration of Homogenizer Optical Element

The homogenizer optical element 413 homogenizes the luminance distribution of the source light entering illumination target areas in the light diffusion device 417 and the wavelength conversion device 419. As such a homogenizer optical element 413, there can be cited two multi-lenses.

It should be noted that the homogenizer optical element 413 is not limited to be disposed on the light emission side of the first retardation element 412, but can also be disposed between the a focal optical element 411 and the first retardation element 412.

Configuration of Light Combining Element

The light combining element 414 has a polarization separation layer tilted about 45° with respect to each of the first illumination optical axis Ax1 and the second illumination optical axis Ax2.

The polarization separation layer has a property of separating the s-polarized light and the p-polarized light included in the source light entering the polarization separation layer via the homogenizer optical element 413 from each other, and further has a property of transmitting the fluorescence generated in the wavelength conversion device 419 irrespective of the polarization state of the fluorescence. In other words, the polarization separation layer has wavelength-selective polarization separation characteristics of separating the s-polarized light and the p-polarized light from each other with respect to the blue light while transmitting both of the s-polarized light and the p-polarized light with respect to the green light and the red light.

Out of the source light entering the light combining element 414 also functioning as a light separation element as described above from the homogenizer optical element 413, the p-polarized light is transmitted by the light combining element 414 toward the second retardation element 415 along the first illumination optical axis Ax1, and the s-polarized light is reflected by the light combining element 414 toward the second light collecting element 418 along the second illumination optical axis Ax2. Further, the light combining element 414 combines the source light entering the light combining element 414 via the second retardation element 415 and the fluorescence entering the light combining element 414 via the second light collecting element 418 with each other.

Configuration of Second Retardation Element and First Light Collecting Element The second retardation element 415 is a quarter-wave plate, converts the source light as the p-polarized light entering the second retardation element 415 from the light combining element 414 into the source light as circularly polarized light, and converts the source light (circularly polarized light in the opposite rotational direction to that circularly polarized light) entering the second retardation element 415 from the first light collecting element 416 into the s-polarized light.

The first light collecting element 416 collects (converges) the source light having passed through the second retardation element 415 to the light diffusion device 417, and further, collimates the source light entering the first light collecting element 416 from the light diffusion device 417.

Configuration of Light Diffusion Device

The light diffusion device 417 has a light diffusion element 4171, and a rotating device 4172 for rotating the light diffusion element 4171.

Among these constituents, the light diffusion element 4171 has a ring-like reflecting layer centered on the rotational axis of the rotation by the rotating device 4172. The reflecting layer diffuses the source light entering the reflecting layer at substantially the same diffusion angle as the fluorescence generated in and emitted from the wavelength conversion device 419. Specifically, the reflecting layer performs the Lambert reflection on the incident light.

The source light having been diffusely reflected by such a light diffusion element 4171 enters the second retardation element 415 once again via the first light collecting element 416. The circularly polarized light having entered the light diffusion element 4171 turns to the circularly polarized light in the opposite rotational direction when being reflected by the light diffusion element 4171, and is converted into the source light as the s-polarized light having the polarization direction rotated as much as 90° with respect to the source light as the p-polarized light passing through the light combining element 414 in the process of passing through the second retardation element 415. The source light as the s-polarized light is reflected by the light combining element 414 described above so as to be parallel to the second illumination optical axis Ax2, and then enters the image forming device 42 as the blue light via the third retardation element RP.

Configuration of Second Light Collecting Element

The source light as the s-polarized light having passed through the homogenizer optical element 413 and then having been reflected by the light combining element 414 described above enters the second light collecting element 418. The second light collecting element 418 converges the source light entering the second light collecting element 418 to the illumination target area (a wavelength conversion layer of the wavelength conversion element 4191) of the wavelength conversion device 419, and further, collimates the fluorescence entering the second light collecting element 418 from the wavelength conversion device 419.

Configuration of Wavelength Conversion Device

The wavelength conversion device 419 has a wavelength conversion element 4191, and a rotating device 4192 for rotating the wavelength conversion element 4191.

The wavelength conversion element 4191 is an optical element for converting the wavelength of the incident light. Although not shown in the drawings, the wavelength conversion element 4191 has a support member having a disk-like shape, and a wavelength conversion layer and a reflecting layer located on a surface on the incident side of the source light in the support member.

The wavelength conversion layer is a phosphor layer including a phosphor excited by the incidence of the source light described above to diffusely emit the fluorescence (the fluorescence having a peak wavelength in a wavelength band of, for example, 500 through 700 nm) as non-polarized light. In other words, the wavelength conversion layer performs the wavelength conversion on the blue light entering the wavelength conversion layer into the fluorescence. A part of the fluorescence generated in such a wavelength conversion layer is emitted toward the second light collecting element 418, and another part thereof is emitted toward the reflecting layer.

The reflecting layer is disposed between the wavelength conversion layer and the support member, and reflects the fluorescence entering the reflecting layer from the wavelength conversion layer toward the second light collecting element 418.

The fluorescence diffusely emitted from such a wavelength conversion element 4191 passes through the second light collecting element 418, the light combining element 414 and the third retardation element RP along the second illumination optical axis Ax2, and then enters the image forming device 42. Specifically, the fluorescence passes through the light combining element 414 to thereby be combined with the source light as the blue light in the light combining element 414, and then enters the image forming device 42 via the third retardation element RP as the white illumination light.

Configuration of Third Retardation Element

The third retardation element RP is a quarter-wave plate, and converts the illumination light entering the third retardation element RP from the light combining element 414 into the circularly polarized light having the s-polarized light and the P-polarized light mixed with each other. The reason that such a third retardation element RP is provided is as follows. Since the fluorescence included in the illumination light is non-polarized light while the blue light is the s-polarized light, it is necessary to prevent the blue light from being emitted from a light emission surface of a polarization conversion element 433 described later in a striped manner to cause color shading in the image to be projected.

Configuration of Image Forming Device

The image forming device 42 modulates the illumination light entering the image forming device 42 from the light source device 41 described above to form the image to be projected by the projection optical device 48. As shown in FIG. 2, the image forming device 42 has a homogenizing device 43, a color separation device 44, a relay device 45, an optical component housing 46 and an electrooptic device 47.

Configuration of Homogenizing Device

The homogenizing device 43 homogenizes the illuminance distribution of the illumination light entering the homogenizing device 43 from the light source device 41. Such a homogenizing device 43 is provided with a first lens array 431, a second lens array 432, a polarization conversion element 433, and a superimposing lens 434.

Among these, the polarization conversion element 433 has a plurality of polarization separation layers, a plurality of reflecting layers, and a plurality of retardation layers although the detailed illustration is omitted.

The plurality of polarization separation layers and the plurality of reflecting layers are formed so as to be elongated in the +Y direction, and are alternately arranged in the +Z direction. It should be noted that the polarization separation layers are disposed at positions which the partial light beams having been emitted from the second lens array 432 enter, respectively. Further, the reflecting layers are disposed at positions which the respective partial light beams do not directly enter.

The polarization separation layers each transmit the p-polarized light and each reflect the s-polarized light. The reflecting layers disposed so as to correspond respectively to the polarization separation layers each reflect the s-polarized light having been reflected by the corresponding polarization separation layer so as to propagate along the passing direction of the p-polarized light. Then, each of the retardation layers is disposed on the light path of the p-polarized light having passed through the polarization separation layer, and converts the p-polarized light entering the retardation layer into the s-polarized light. Thus, the light beams emitted from the polarization conversion element 433 are uniformed in polarization direction to be s-polarized light, and the s-polarized light is emitted from the roughly entire area in the light emission surface of the polarization conversion element 433. It should be noted that the polarization conversion element 433 can also be provided with a configuration of uniforming the light beams into the p-polarized light and emitting the p-polarized light.

Configuration of Color Separation Device

The color separation device 44 separates the light beam entering the color separation device 44 from the homogenizing device 43 into three colored light beams of red (R), green (G), and blue (B). The color separation device 44 has dichroic mirrors 441, 442, and a reflecting mirror 443. Besides the above, the color separation device 44 can also be provided with a lens which the blue light LB having been reflected by the dichroic mirror 441 enters, and a lens which the green light LG and the red light LR having passed through the dichroic mirror 441 enter.

Configuration of Relay Device

The relay device 45 is disposed on the light path of the red light LR having passed through the dichroic mirror 442 to guide the red light LR to a field lens 471 for the red light LR. The relay device 45 is provided with an incident side lens 451, a reflecting mirror 452, a relay lens 453, and a reflecting mirror 454. It should be noted that it is assumed that the relay device 45 is provided with a configuration of transmitting the red light LR in the present embodiment, but is not limited to this configuration, and can also be provided with a configuration of transmitting, for example, the blue light LB.

Configuration of Optical Component Housing

The optical component housing 46 is a box-like housing having an illumination optical axis Ax set inside. At positions on the illumination optical axis Ax inside the optical component housing 46, there are disposed the homogenizing device 43, the color separation device 44 and the relay device 45 described above. The light source device 41 is disposed so that the second illumination optical axis Ax2 described above corresponds to the illumination optical axis Ax. Further, the light source device 47 and the projection optical device 48 are disposed in accordance with the illumination optical axis Ax.

Such an optical component housing 46 are combined with another housing to constitute a sealed housing 511 described later. The sealed housing 511 forms a first space 51 inside of which is roughly sealed. Inside such a sealed housing 511, there are arranged the polarization conversion element 433 described above and the electro-optic device 47.

Configuration of Electro-optic Device

The electro-optic device 47 modulates each of the colored light beams, which have been separated from each other, and then combines the colored light beams, which have been modulated, with each other to form image light. The electro-optic device 47 has the field lenses 471 and light modulation devices 472 respectively provided for the colored light beams, and a single color combining device 476.

The field lenses 471 are each a lens for collimating the incident light, and are each inserted in a groove part provided to the optical component housing 46 described above.

The light modulation devices 472 (the light modulation devices for red, green, and blue are respectively defined as 472R, 472G, and 472B) each modulate the light emitted from the light source device 41. More specifically, the light modulation devices 472 each modulate the colored light beam entering the light modulation device 472 via the corresponding field lens 471 in accordance with the image information to form the image. In the present embodiment, the light modulation devices 472 each have a liquid crystal panel 474, and an incident side polarization plate 473 and an emission side polarization plate 475 located on the light incident side and the light emission side of the liquid crystal panel 474. In other words, in the present embodiment, the light modulation devices 472 are each constituted by a liquid crystal light valve.

Among these constituents, the liquid crystal panels 474 each have a panel main body in which the liquid crystal is encapsulated, and a cooling section for housing the panel main body inside, and having a flow channel through which a liquid refrigerant (a second refrigerant RE2 described later) flows formed inside although not shown in the drawings. To the cooling section, there are transferred not only the heat of the panel main body, but also the heat of the incident side polarization plate 473 and the emission side polarization plate 475. Then, the heat transferred from the panel main body and the polarization plates 473, 475 is transferred by the cooling section to the liquid refrigerant, and thus, the cooling section cools the panel main body and the polarization plates 473, 475.

The color combining device 476 is constituted by a cross dichroic prism formed to have a roughly quadrangular prism shape. The color combining device 476 has three planes of incidence which the colored light beams having passed through the respective light modulation devices 472 enter, and the emission surface from which the image light obtained by combining the colored light beams with each other is emitted. The emission surface is opposed to the projection optical device 48.

The light modulation devices 472 are respectively attached to the corresponding planes of incidence of such a color combining device 476 via a holding members (not shown). Thus, the color combining device 476 and the light modulation devices 472 are integrated with each other. Hereinafter, the configuration in which the light modulation devices 472 and the color combining device 476 are integrated with each other is referred to as an image forming unit FU in some cases.

Configuration of Projection Optical Device

The projection optical device 48 is disposed so as to partially be exposed from the opening section 231 (see FIG. 1) of the exterior housing 2. The projection optical device 48 projects the image light entering the projection optical device 48 from the color combining device 476 (the image forming device 42) on the projection target surface in an enlarged manner to thereby display the image formed by the image light. Such a projection optical device 48 can be configured as a combination lens having a plurality of lenses arranged in a lens tube.

Configuration of Cooling Device

Figure 4:
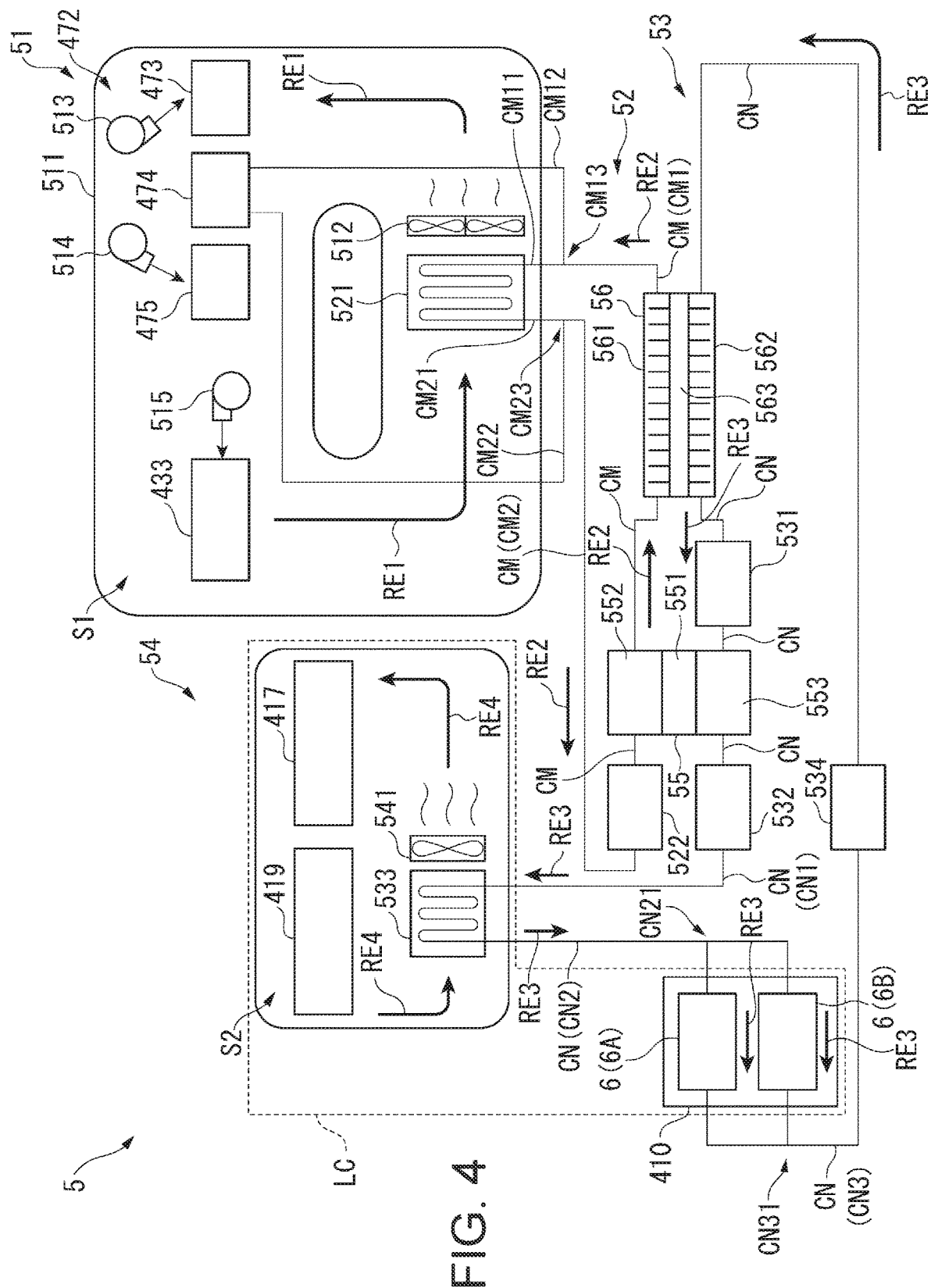
FIG. 4 is a schematic diagram showing a configuration of a cooling device in the embodiment mentioned above.

FIG. 4 is a schematic diagram showing a configuration of the cooling device 5.

The cooling device 5 cools the cooling targets constituting the projector 1. The cooling device 5 is provided with a first circulation channel 51, a second circulation channel 52, a third circulation channel 53 and a fourth circulation channel 54 as a configuration for cooling the image projection device 4 as shown in FIG. 4. These circulation channels 51 through 54 circulate a gaseous refrigerant or a liquid refrigerant to thereby cool the cooling targets.

Each of the circulation channels 51 through 54 will hereinafter be described.

Configuration of First Circulation Channel

The first circulation channel 51 is a flow channel through which the first refrigerant RE1 as a gas in the sealed housing 511 circulates, and cools the light modulation devices 472 and the polarization conversion element 433 as the cooling targets with the first refrigerant RE1. The first circulation channel 51 is configured including the sealed housing 511, a circulation fan 512, blower fans 513 through 515, and a first heat exchanger 521.

It should be noted that the first refrigerant RE1 is only required to be a gas, and can also be a gas (e.g., nitrogen gas or helium gas) other than air.

The sealed housing 511 is configured by the optical component housing 46 and another housing combined with each other as described above, and forms the first space S1 described above inside. Inside the sealed housing 511, there are disposed the light modulation devices 472 and the polarization conversion element 433, the circulation fan 512, the blower fans 513 through 515 and the first heat exchanger 521.

The first heat exchanger 521 constitutes the first circulation channel 51 and the second circulation channel 52 described later. The first heat exchanger 521 transfers the heat of the first refrigerant RE1 to the second refrigerant RE2 flowing inside to thereby cool the first refrigerant RE1.

The circulation fan 512 is a fan for circulating the first refrigerant RE1 having been cooled by the first heat exchanger 521 inside the sealed housing 511.

In the present embodiment, the blower fans 513, 514 are disposed for each of the light modulation devices 472R, 472G, 472B, and make the first refrigerant RE1 flow through the corresponding light modulation device 472. In the detailed description, the blower fan 513 feeds the first refrigerant RE1 to the incident side polarization plate 473 and the liquid crystal panel 474 of the corresponding light modulation device 472. Further, the blower fan 514 feeds the first refrigerant RE1 to the liquid crystal panel 474 and the emission side polarization plate 475 of the corresponding light modulation device 472. It should be noted that it is also possible to dispose a single blower fan 513 and a single blower fan 514 and divide the flow of the first refrigerant RE1 fed by the blower fan 513 to flow through the respective light modulation devices 472, and divide the flow of the first refrigerant RE1 fed by the blower fan 514 to flow through the respective light modulation devices 472.

The blower fan 515 makes the first refrigerant RE1 flow through the polarization conversion element 433.

In such a first circulation channel 51, the first refrigerant RE1 having cooled the polarization conversion element 433 and the light modulation devices 472 is suctioned by the circulation fan 512 to flow through the first heat exchanger 521. Then, the first refrigerant RE1 having been cooled by the first heat exchanger 521 flows once again through the light modulation devices 472 and the polarization conversion element 433. As described above, the first refrigerant RE1 circulates inside the sealed housing 511.

Configuration of Second Circulation Channel

The second circulation channel 52 is a flow channel through which the second refrigerant RE2 as a liquid refrigerant circulates, and cools the first refrigerant RE1 and at the same time cools the liquid crystal panels 474 of the respective light modulation devices 472. The second circulation channel 52 is configured including the first heat exchanger 521 described above, a tank 522, a pump 55 and a second heat exchanger 56, and a plurality of connection members CM for connecting these constituents to each other.

It should be noted that the connection members CM are each a tubular member formed so that the second refrigerant RE2 can flow through the tubular member. Further, as such a refrigerant RE2, there can be cited water and an antifreeze solution such as propylene glycol.

The first heat exchanger 521 cools the first refrigerant RE1 as described above.

The tank 522 temporarily retains the second refrigerant RE2. The second refrigerant RE2 retained in the tank 522 is suctioned by the pump 55.

The pump 55 has a pressure feeding section 551 and inflow chambers 552, 553.

The second refrigerant RE2 flows into the inflow chamber 552 from the tank 522. By driving the pressure feeding section 551, the second refrigerant RE2 having flowed into the inflow chamber 552 is made to flow through the first heat exchanger 521 via a heat receiving section 561 of the second heat exchanger 56. Further, a third refrigerant RE3 circulating through the third circulation channel 53 described later flows into the inflow chamber 553. The third refrigerant RE3 having flowed into the inflow chamber 553 will be described later in detail.

The second heat exchanger 56 is provided with the heat receiving section 561 through which the second refrigerant RE2 having been pressure-fed by the pump 55 flows, a heat radiation section 562 through which the third refrigerant RE3 flows, and a heat transmission section 563 for transferring the heat of the second refrigerant RE2 having been received by the heat receiving section 561 to the heat radiation section 562. Due to the second heat exchanger 56, the second refrigerant RE2 the heat of which has been transferred to the third refrigerant RE3, and which has thus been cooled, is made to flow through the first heat exchanger 521 described above. It should be noted that in the present embodiment, a Peltier element is used as the heat transmission section 563 in order to increase the heat-transfer efficiency from the heat receiving section 561 to the heat radiation section 562. However, this is not a limitation, but such a Peltier element can be eliminated.

Here, among the plurality of connection members CM, the connection member CM1 through which the second refrigerant RE2 having been cooled by the second heat exchanger 56 flows has a pipe CM11 connected to the first heat exchanger 521, a pipe CM12 connected to the liquid crystal panels 474, and a branch part CM13 for connecting these pipes CM11, CM12 to each other and distributing the second refrigerant RE2 to the pipes CM11, CM12. Due to the configuration of such a connection member CM1, a part of the second refrigerant RE2 having flowed into the connection member CM1 flows through the first heat exchanger 521, and another part of the second refrigerant RE2 flows through the liquid crystal panels 474. Therefore, the light modulation devices 472 are cooled not only by the first refrigerant RE1 but also by the second refrigerant RE2.

Further, among the plurality of connection members CM, the connection member CM2 for making the second refrigerant RE2 flow into the tank 522 has a pipe CM21 to be connected to the first heat exchanger 521, a pipe CM22 to be connected to the liquid crystal panels 474, and a junction part CM23 for connecting these pipes CM21, CM22 to each other. Due to such a connection member CM2, the second refrigerant RE2 having flowed through the first heat exchanger 521 and the second refrigerant RE2 having flowed through the liquid crystal panels 474 are merged in the junction part CM23 to flow into the tank 522.

It should be noted that in the present embodiment, the second refrigerant RE2 flowing via the pipe 12 flows through the liquid crystal panels 474 of the respective light modulation devices 472 in sequence. Therefore, the liquid crystal panel 474 located on the upstream-most side in the flow direction of the second refrigerant RE2 is connected to the pipe CM12, and that liquid crystal panel 474 is connected to another of the liquid crystal panels 474 via a pipe. Further, the liquid crystal panel 474 located on the downstream-most side is connected to the pipe CM22 described above.

However, this is not a limitation, but it is also possible to adopt a configuration in which each of the liquid crystal panels 474 is connected to the pipe CM12, and each of the liquid crystal panels 474 is connected to the pipe CM22.

In such a second circulation channel 52, the second refrigerant RE2 retained in the tank 522 is suctioned by the pump 55 to be pressure-fed to the second heat exchanger 56. The second refrigerant RE2 which has flowed through the heat receiving section 561 of the second heat exchanger 56 to thereby be cooled, flows through the first heat exchanger 521 and each of the liquid crystal panels 474 (each of the light modulation devices 472) due to the connection member CM1. The second refrigerant RE2 to which the heat of the first heat exchanger 521 and each of the light modulation devices 472 has been transferred is made to flow into the tank 522 via the connection member CM2, and is then retained in the tank 522 once again. As described above, the second refrigerant RE2 circulates through the second circulation channel 52 while cooling the first heat exchanger 521 to which the heat of the first refrigerant RE1 has been transferred, and each of the light modulation devices 472. It should be noted that as described above, the heat of the second refrigerant RE2 is transferred to the third refrigerant RE3 in the second heat exchanger 56.

Configuration of Fourth Circulation Channel

Here, the fourth circulation channel 54 will be described in advance.

The fourth circulation channel 54 is a flow channel for circulating the fourth refrigerant RE4 as a gas in the second space S2 disposed inside the light source housing LC described above to cool the light diffusion device 417 and the wavelength conversion device 419 as the cooling targets located in the second space S2. The fourth circulation channel 54 is provided with the light source housing LC, and a third heat exchanger 533 and a circulation fan 541 each disposed in the second space S2. It should be noted that the fourth refrigerant RE4 can be the same as or different from the first refrigerant RE1 in components.

The third heat exchanger 533 constitutes the fourth circulation channel 54 and the third circulation channel 53 described later. The third heat exchanger 533 transfers the heat of the fourth refrigerant RE4 to the third refrigerant RE3 flowing inside to thereby cool the fourth refrigerant RE4. As shown in FIG. 3, such a third heat exchanger 533 is disposed at a position located on the +Z direction side with respect to the light diffusion device 417 in the light source housing LC.

As shown in FIG. 4, the circulation fan 541 circulates the fourth refrigerant RE4 in the second space S2. The circulation fan 541 makes the fourth refrigerant RE4 having been cooled in the third heat exchanger 533 flow through the light diffusion device 417 and the wavelength conversion device 419 to thereby cool these constituents.

It should be noted that in FIG. 4, the fourth refrigerant RE4 is illustrated so as to flow through the light diffusion device 417 and then flow through the wavelength conversion device 419. However, the order of the flow of the fourth refrigerant RE4 can be reversed, and it is also possible for the flow channel of the fourth refrigerant RE4 to be a flow channel in which the fourth refrigerant RE4 divided into two respectively flows through the light diffusion device 417 and the wavelength conversion device 419.

Configuration of Third Circulation Channel

The third circulation channel 53 is a flow channel for circulating the third refrigerant RE3 as the liquid refrigerant to thereby cool the second refrigerant RE2 and the fourth refrigerant RE4, and further cool the first light source 4101 and the second light source 4102 described above. The third circulation channel 53 is configured including the tank 531, the pump 55, a first radiator 532, the third heat exchanger 533, light source cooling sections 6 (6A, 6B), a second radiator 534 and the second heat exchanger 56, and a plurality of connection members CN for connecting these constituents to each other.

Among these constituents, the connection members CN are each a tubular member through which the third refrigerant RE3 can flow. It should be noted that the third refrigerant RE3 can be the same as or different from the second refrigerant RE2 in components.

The tank 531 is connected to the heat radiation section 562 of the second heat exchanger 56 described above, and temporarily retains the third refrigerant RE3.

The third refrigerant RE3 having been made to flow into the inflow chamber 553 from the tank 531 by the pressure-feeding section 551 is pressure-fed by the pump 55 to the first radiator 532 via the connection member CN1 out of the connection members CN.

The first radiator 532 is located immediately upstream with respect to the third heat exchanger 533 in the flow channel of the third refrigerant RE3, and cools the third refrigerant RE3 flowing through the third heat exchanger 533. Specifically, the first radiator 532 transfers the heat received from the third refrigerant RE3 pressure-fed from the pump 55 and flowing inside the first radiator 532 to the cooling gas flowing through the first radiator 532 to thereby cool the third refrigerant RE3. It should be noted that a cooling fan FN4 (see FIG. 1) for making the cooling gas flow through the first radiator 532 will be described later in detail.

The third heat exchanger 533 is disposed inside the light source housing LC as described above, and transfers the heat of the fourth refrigerant RE4 to the third refrigerant RE3 flowing from the first radiator 532 to cool the fourth refrigerant RE4. The third refrigerant RE3 having flowed through the third heat exchanger 533 flows through each of the light source cooling sections 6 via the connection member CN2 out of the connection members CN.

The light source cooling sections 6 are respectively provided to the first light source 4101 and the second light source 4102 (see FIG. 3), and respectively cool the corresponding light sources. Among these light source cooling sections 6, the light source cooling section 6 provided to the first light source 4101 is defined as the light source cooling section 6A, and the light source cooling section 6 provided to the second light source 4102 is defined as the light source cooling section 6B. The light source cooling section 6A corresponds to a first cooling section. Further, the light source cooling section 6B corresponds to a second cooling section.

These light source cooling sections 6A, 6B are each provided with a plurality of fine flow channels formed inside, and the third refrigerant RE3 distributed by a flow-dividing part CN21 provided to the connection member CN2 flows through the fine flow channels. Then, the light source cooling sections 6A, 6B each transfer the heat having been transferred from the corresponding light source to the third refrigerant RE3 to cool the light source. The third refrigerant RE3 having flowed through the light source cooling section 6A and the third refrigerant RE3 having flowed through the light source cooling section 6B are merged in a junction part CN31 described later provided to the connection member CN3 out of the connection members CN, and then flow into the second radiator 534 via the connection member CN3. Such light source cooling sections 6 will be described later in detail.

As shown in FIG. 4, the flow-dividing part CN21 is disposed on the upstream side of the two light source cooling sections 6A, 6B in the flow direction of the third refrigerant RE3 in the connection member CN2, and divides the flow of the third refrigerant RE3 flowing from the third heat exchanger 533 through the connection member CN2 into the third refrigerant RE3 flowing toward the light source cooling section 6A and the third refrigerant RE3 flowing toward the light source cooling section 6B. Meanwhile, the junction part CN31 is disposed on the downstream side of the two light source cooling sections 6A, 6B in the flow direction of the third refrigerant RE3 in the connection member CN3, and merges the third refrigerant RE3 having flowed through the light source cooling section 6A and the third refrigerant RE3 having flowed through the light source cooling section 6B with each other. The flow-dividing part CN21 will be described later in detail.

The second radiator 534 transfers the heat of the third refrigerant RE3 flowing inside to the cooling gas flowing through the second radiator 534 to thereby cool the third refrigerant RE3. The third refrigerant RE3 having been cooled by the second radiator 534 is made to flow through the heat radiation section 562 of the second heat exchanger 56 described above. It should be noted that a cooling fan FN5 (see FIG. 1) for making the cooling gas flow through the second radiator 534 will be described later in detail.

In such a third circulation channel 53, the third refrigerant RE3 retained in the tank 531 is pressure-fed by the pump 55, and is supplied to the third heat exchanger 533 inside the light source housing LC via the first radiator 532. Due to the third heat exchanger 533, the fourth refrigerant RE4 is cooled, and the third refrigerant RE3 having flowed through the third heat exchanger 533 flows through the light source cooling sections 6A, 6B to cool the first light source 4101 and the second light source 4102. The third refrigerant RE3 having flowed through these light source cooling sections 6A, 6B is cooled in the second radiator 534, and then flows into the heat radiation section 562 of the second heat exchanger 56. The third refrigerant RE3 to which the heat of the second refrigerant RE2 has been transferred in the heat radiation section 562 is retained once again in the tank 531. As described above, the third refrigerant RE3 circulates through the third circulation channel 53.

Arrangement of Fans

In addition to the configuration described above, the cooling device 5 is provided with intake fans FN1, FN2, an exhaust fan FN3, and the cooling fans FN4, FN5 disposed inside the exterior housing 2 as shown in FIG. 1.

The intake fans FN1, FN2 are disposed so as to correspond respectively to the introduction ports 232, 233 located in the front surface part 23 of the exterior housing 2, and introduce the gas located outside the exterior housing 2 inside as the cooling gas via the introduction ports 232, 233.

The exhaust fan FN3 is disposed in accordance with the discharge port 241 located in the back surface part 24 of the exterior housing 2, and discharges the cooling gas having flowed inside the exterior housing 2 to cool the cooling targets to the outside of the exterior housing 2 via the discharge port 241.

The cooling fans FN4, FN5 are each disposed in accordance with the discharge port 242 located in the back surface part 24. On the upstream side (i.e., on the +Z direction side) of the cooling gas made to flow by these cooling fans FN4, FN5, there are disposed the first radiator 532 and the second radiator 534 described above.

When these cooling fans FN4, FN5 are driven, the cooling gas having been introduced inside the exterior housing 2 flows through the first radiator 532 and the second radiator 534, and these radiators 532, 534 transfer the heat of the third refrigerant RE3 to the cooling gas flowing therethrough. Thus, the third refrigerant RE3 is cooled. Then, the cooling gas having flowed through the radiators 532, 534 is discharged outside the exterior housing 2 from the exhaust port 242 by the cooling fans FN4, FN5.

Configuration of First Light Source and Second Light Source

Figure 5:
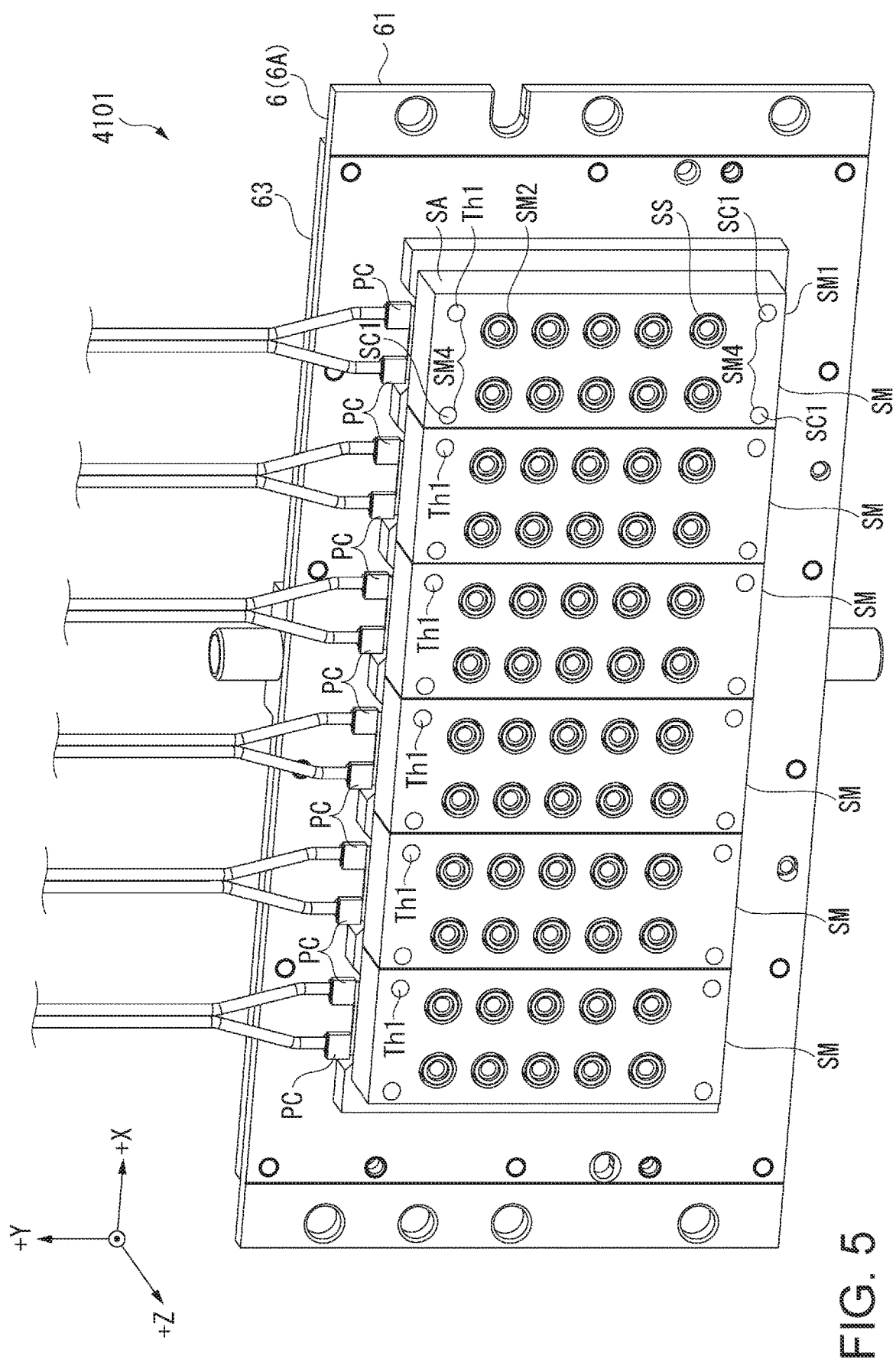
FIG. 5 is a perspective view of a first light source in the embodiment mentioned above viewed from a light emission side.

FIG. 5 is a perspective view of the first light source 4101 viewed from the light emission side. It should be noted that in FIG. 5, some of the reference symbols are omitted taking eye-friendliness into consideration.

As shown in FIG. 5, the first light source 4101 described above has a light source array SA in which a plurality of solid-state light sources SS as first light emitting elements are arranged, and the light source cooling section 6A. In other words, in the first light source 4101, there is disposed a plurality of first light emitting elements.

It should be noted that the second light source 4102 also has the light source array SA in which a plurality of solid-state light sources SS as second light emitting elements are arranged, and the light source cooling section 6B.

In other words, in the second light source 4102, there is disposed a plurality of second light emitting elements. It should be noted that the second light source 4102 has substantially the same configuration as that of the first light source 4101, and therefore, the explanation thereof will be omitted.

Configuration of Light Source Array

The light source array SA has a configuration in which a plurality of solid-state light sources SS are arranged in a matrix. In the detailed description, the light source array SA has a configuration in which a plurality of light source modules SM arranged along the short-side direction of the light source modules SM, wherein each of the light source modules SM has a predetermined number of solid-state light sources SS arranged in a matrix.

It should be noted that in the present embodiment, a laser diode (LD) for emitting blue light with the peak wavelength of 440 nm as the source light is adopted as the solid-state light source SS. However, this is not a limitation, and it is possible to adopt an LD for emitting blue light with the peak wavelength of 446 nm or an LD for emitting blue light with the peak wavelength of 460 nm, and it is also possible to adopt other solid-state light sources such as a light emitting diode (LED).

Figure 6:
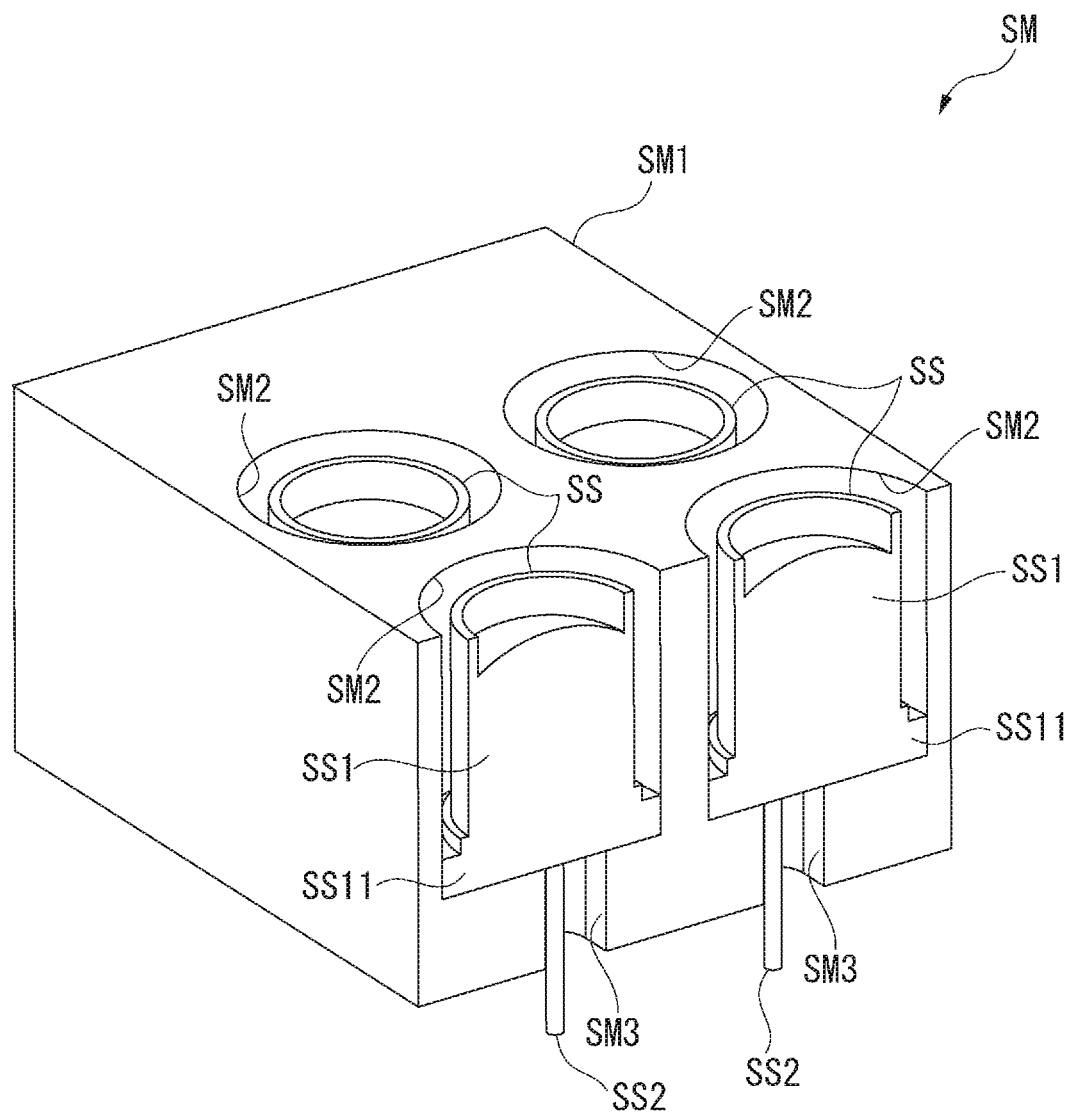
FIG. 6 is a cross-sectional view showing a light source module in the embodiment mentioned above.

FIG. 6 is a cross-sectional view showing the light source module SM.

As shown in FIG. 5 and FIG. 6, the light source module SM is provided with the plurality of solid-state light sources SS and a support section SM1 having a roughly rectangular solid shape for supporting the plurality of solid-state light sources SS.

The support section SM1 has a plurality of recessed parts SM2 each cut out to have a roughly cylindrical shape, wherein the recessed parts SM2 are formed in two lines each including five recessed parts SM2 along the longitudinal direction of the support section SM1. As shown in FIG. 6, a bottom part of each of the recessed parts SM2 is provided with a hole part SM3. Further, in each of the recessed parts SM2, there is disposed the solid-state light source SS so that a terminal part SS2 extending from an element part SS1 in the solid-state light source SS is inserted through the hole part SM3.

In the state in which the solid-state light sources SS are disposed in the respective recessed parts SM2, a stem SS11 in the element part SS1 has contact with the bottom part of the recessed part SM2 as shown in FIG. 6, and the heat generated in the element part SS1 is transferred to the support section SM1.

Further, the terminal part SS2 inserted through the hole part SM3 is connected to a printed circuit board PC disposed on an opposite side to the light emission side of the solid-state light source SS in the support section SM1.

It should be noted that the number and the arrangement of the recessed parts SM2, namely the number and the arrangement of the solid-state light sources SS, in each of the support sections SM1 can arbitrarily be changed.

As shown in FIG. 5, on the four corners in such a support section SM1, there are formed hole parts SM4 through which screws SC1 for fixing the support section SM1 (i.e., the light source module SM) to the light source cooling section 6A are respectively inserted. Any one of these hole parts SM4 is provided with a temperature detection section Th1. The temperature detection section Th1 detects the temperature of the light source module SM to which the temperature detection section Th1 is attached, and then outputs the temperature thus detected to the control device 9. Therefore, the temperature detection sections Th1 provided to the first light source 4101 detect the temperature of the first light source 4101. Further, the temperature detection sections Th1 provided to the second light source 4102 detect the temperature of the second light source 4102.

Configuration of Light Source Cooling Sections

Figure 7:
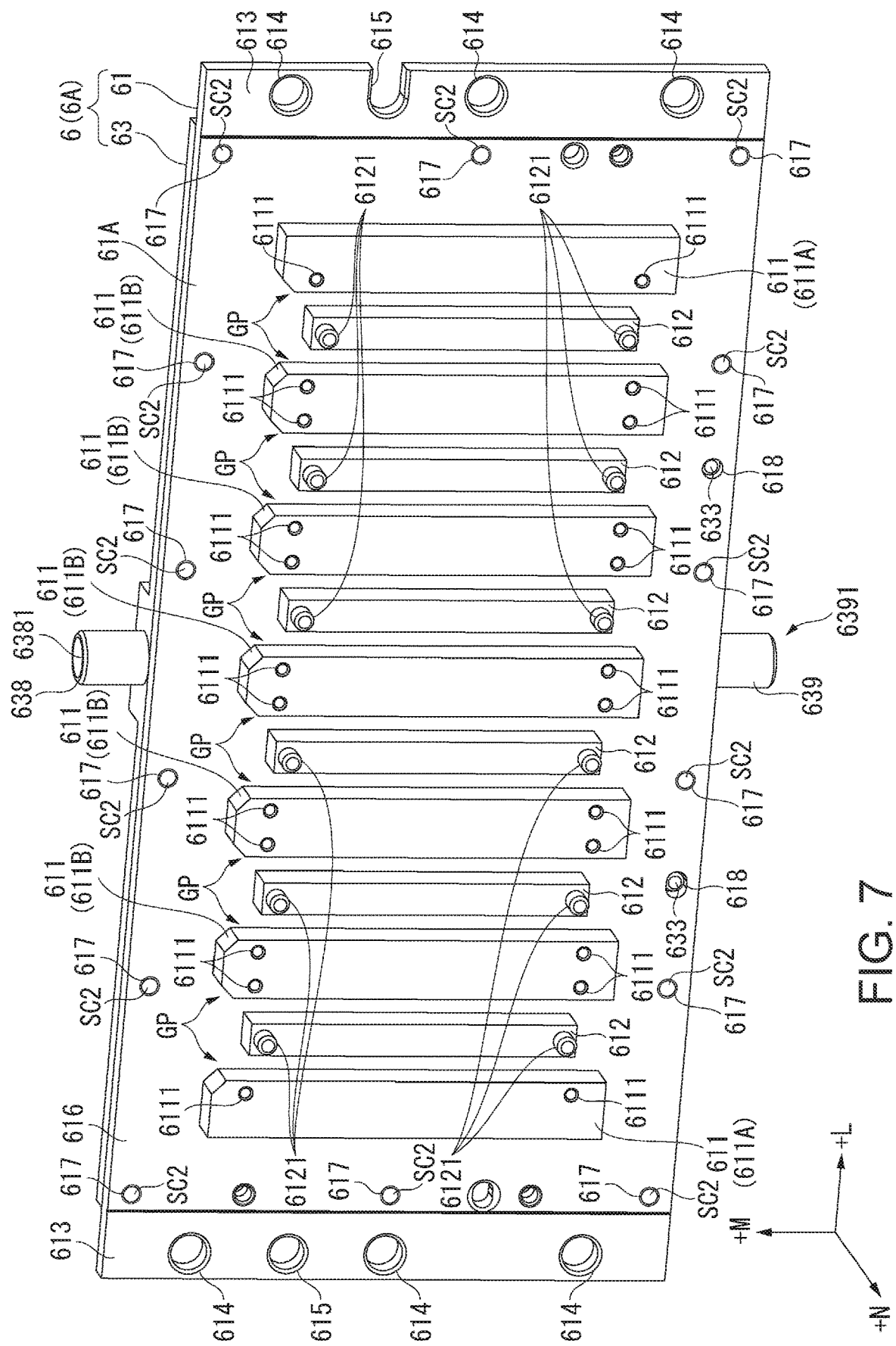
FIG. 7 is a perspective view of a light source cooling section in the embodiment mentioned above viewed from the light emission side.

FIG. 7 is a perspective view of the light source cooling section 6A viewed from the light source array SA side (the light emission side).

The light source section 6 (6A) supports the light source array SA, and at the same time, transfers the heat transferred from the light source array SA to the liquid refrigerant (the third refrigerant RE3) flowing through the internal flow channel to cool the light source array SA. As shown in FIG. 7, the light source cooling section 6A is formed to have a rectangular shape viewed from the light source array SA side. Such a light source cooling section 6A is provided with a first member 61 to which the light source array SA is fixed, and a second member 63 located on an opposite side to the side on which the light source array SA is attached in the first member 61, and is constituted by the first member 61 and the second member 63 combined with each other.

It should be noted that in the following description of the light source cooling section 6, the emission direction of the light by the light source array SA attached to the light source cooling section 6 is defined as a +N direction. Further, among a +L direction and a +M direction crossing the +N direction and crossing each other, a direction parallel to the longitudinal direction of the light source cooling section 6 is defined as the +L direction, and a direction parallel to the short-side direction thereof is defined as the +M direction. Further, although not shown in the drawings, an opposite direction to the +N direction is defined as a −N direction. The same applies to a −L direction and a −M direction. It should be noted that in the present embodiment, the +L direction, the +M direction and the +N direction are defined as directions perpendicular to each other.

Configuration of First Member

The first member 61 is formed of metal having a thermal conductivity. As shown in FIG. 7, the first member 61 has a plurality of attachment sections 611 to which the respective light source modules SM are attached, a plurality of positioning sections 612 for positioning the respective light source modules SM, two first fixation sections 613 located on both ends of the first member 61, and a second fixation section 616 located on a peripheral edge of the first member 61 all disposed on a surface 61A located on the +N direction side.

The attachment sections 611 (611A, 611B) are each a projected line projecting from the surface 61A toward the +N direction, and extending in the +M direction, and are arranged along the +L direction. These attachment sections 611 are disposed in accordance with the number of the light source modules SM. Specifically, since the light source array SA of the present embodiment has six light source modules SM, the first member 61 has seven attachment sections 611.

Among these attachment sections 611, the two attachment sections 611A located at the both ends in the +L direction each have the screw hole 6111 to which the screw SC1 described above is fixed at each of the end parts on the +M direction side and the −M direction side.

Further, among the attachment sections 611, the five attachment sections 611B located between the two attachment sections 611A each have the two screw holes 6111 arranged along the +L direction at each of the end parts on the +M direction side and the −M direction side. The screw SC1 described above is also fixed to each of these screw holes 6111.

The plurality of positioning sections 612 are each a projected line projecting from the surface 61A toward the +N direction, and extending in the +M direction, and are each located between the two attachment sections 611 adjacent to each other in the +L direction among the plurality of attachment sections 611 described above. Each of these positioning sections 612 has a projection section 6121 projecting toward the +N direction at each of the end parts on the +M direction side and the −M direction side.

Further, by the tip part of each of the screws SC1 inserted into the hole sections SM4 being fixed to the corresponding screw hole 6111 described above in the state in which these projection sections 6121 are inserted into hole sections (not shown) provided to the support section SM1 of the light source module SM, and thus, the support section SM1 is positioned, the light source module SM is attached to the attachment sections 611, namely to the first member 61. On this occasion, the attachment sections 611 and the positioning sections 612 each have contact with the light source module SM (the support section SM1), the heat of the light source module SM is transferred to the attachment sections 611 and the positioning sections 612.

It should be noted that a gap GP is formed between the attachment section 611 and the positioning section 612 in the +L direction. The printed circuit boards PC are respectively disposed in the gaps GP.

The first fixation sections 613 are regions located at the both ends in the +L direction in the first member 61, and used when fixing the light source cooling section 6 to the light source housing LC. These first fixation sections 613 each have hole parts 614 to which screws SC3 (see FIG. 14) described later for fixing the light source cooling section 6 to the light source housing LC are respectively inserted, and a positioning hole 615 to which a positioning projection LC33 (see FIG. 14) described later provided to the light source housing LC so as to project therefrom is inserted. The light source cooling section 6 is attached to the light source housing LC with the screws SC3 in such a manner.

The fixation of the light source cooling section 6 to the light source housing LC using such first fixation sections 613 will be described later in detail.

The second fixation section 616 is a region located on the peripheral edge of the first member 61, and used when fixing the second member 63 to the first member 61. The second fixation section 616 has screw holes 617 to which screws SC2 for fixing the second member 63 to the first member 61 are respectively fixed, and positioning holes 618 to which positioning projections 633 provided to the second member 63 so as to project therefrom are respectively inserted.

Figure 8:
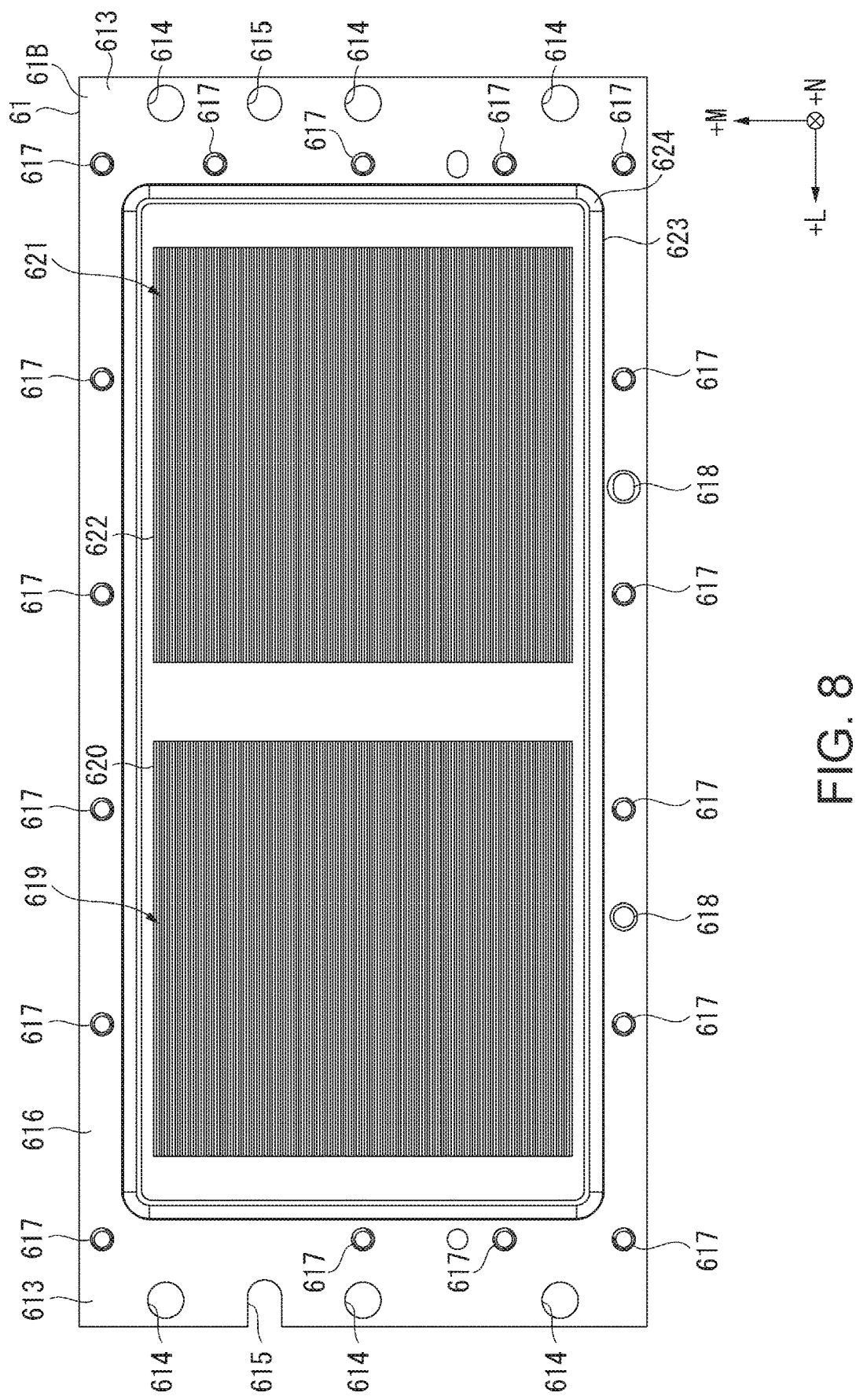
FIG. 8 is a diagram of a first member in the embodiment mentioned above viewed from an opposite side to the light source array.

FIG. 8 is a diagram showing the first member 61 viewed from an opposite side (the −N direction side) to the side on which the light source array SA is attached in the first member 61.

As shown in FIG. 8, the first member 61 has a first fin 619, a second fin 621, a groove part 623 and a seal member 624 each located on a surface 61B on an opposite side to the side on which the light source array SA is attached.

The first fin 619 is located on the +L direction side in the surface 61B, and the second fin 621 is located on the −L direction side in the surface 61B, and a predetermined distance is provided between these fins 619, 621.

The first fin 619 is formed by arranging a plurality of fin elements 620 in the +M direction, wherein each of the fin elements 620 projects toward the −N direction from the surface 61B, and extends along the +L direction. Similarly, the second fin 621 is formed by arranging a plurality of fin elements 622 in the +M direction, wherein each of the fin elements 622 projects toward the −N direction from the surface 61B, and extends along the +L direction. These fins 619, 621 form a part of a flow channel through which the liquid refrigerant (the third refrigerant RE3) flows when the first member 61 and the second member 63 are combined with each other, and the liquid refrigerant flows between the fin elements 620 forming the first fin 619 and between the fin elements 622 forming the second fin 621. In other words, the light source cooling sections 6A, 6B each have flow channels through which the liquid refrigerant flows. The flow channels of the liquid refrigerant will be described later in detail.

The groove part 623 is formed so as to surround the fins 619, 621. In the groove part 623, there is fitted the seal member 624 having a ring-like shape. The seal member has contact with the surface 63A on the +N direction side in the second member 63 to prevent the liquid refrigerant flowing through the flow channel described later from being leaked outside.

Configuration of Second Member

Figure 9:
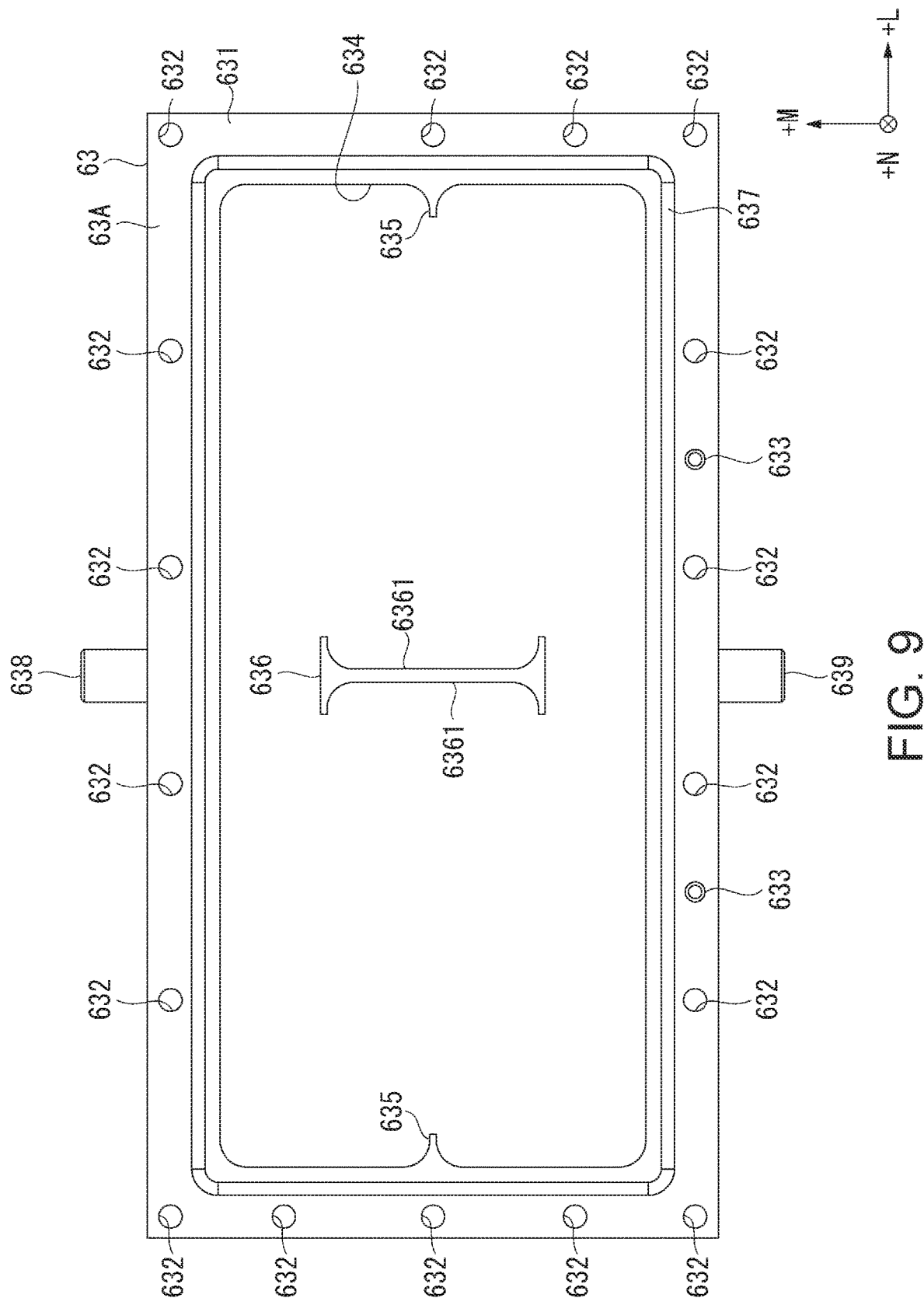
FIG. 9 is a diagram of a second member in the embodiment mentioned above viewed from the first member side.

FIG. 9 is a diagram showing the second member 63 viewed from the side (the +N direction side) on which the second member 63 is attached to the first member 61.

The second member 63 is formed of metal, and is combined with the first member 61 to thereby form the flow channel inside through which the liquid refrigerant described above can flow. As shown in FIG. 7, the second member 63 has a size corresponding to the dimension of a region of the first member 61 excluding the first fixation sections 613, and is combined with the first member 61 from the −N direction side.

As shown in FIG. 9, such a second member 63 has a fixation section 631, a recessed part 634, a groove part 637, an inflow section 638 and an outflow section 639.

The fixation section 631 is a region located on the peripheral edge of the second member 63 to fix the second member 63 to the first member 61. The fixation section 631 has a plurality of hole parts 632 through which the screws SC2 are respectively inserted, and positioning projections 633 to be respectively inserted into the positioning holes 618 of the first member 61.

Among these, the positioning projections 633 project toward the +N direction from the surface 63A on the side (the +N direction side) on which the second member 63 is attached to the first member 61. Further, by fixing the screws SC2 inserted through the hole parts 632 from the −N direction side to the respective screw holes 617 of the first member 61 in the state in which the positioning projections 633 are inserted into the respective positioning holes 618, the second member 63 is fixed to the first member 61.

The recessed part 634 is located in a roughly central area of the second member 63, and is formed so as to be recessed toward the −N direction to have a rectangular shape elongated in the +L direction. Among inner surfaces of the recessed part 634, on the inner surfaces located on the +L direction side and the −L direction side, there are formed two projection parts 645, respectively.

Further, in a roughly central area in the bottom surface (the surface on the −N direction side) of the recessed part 634, there is formed a projection part 636 projecting toward the +N direction from the bottom surface and having a roughly I-shape along the +M direction. In each of the regions on the +L direction side and the −L direction side in the projection part 636, there is formed a concave part 6361.

These projection parts 635, 636 have contact with the fins 619, 621 described above to form a part of the flow channel of the liquid refrigerant when the first member 61 and the second member 63 are combined with each other. The projection part 636 is disposed so as to correspond to the predetermined distance described above between the first fin 619 and the second fin 621 in the first member 61 when the first member 61 and the second member 63 are combined with each other. In other words, the recessed part 634, the projection parts 635, 636, and the fins 619, 621 correspond to a flow channel forming section.

Further, in the case of viewing the light source cooling section 6 from an opposite side (the −N direction side) to the emission side of the light by the light source array SA, the forming position of the recessed part 634, namely the flow channel of the liquid refrigerant formed inside the recessed part 634, is located so as to overlap the light source array SA. Specifically, the light source cooling section 6A is disposed so that the flow channel through which the liquid refrigerant flows overlaps the plurality of solid-state light sources SS (the plurality of first light emitting elements) of the first light source 4101 when viewing the light source cooling section 6A from an opposite side to the side on which the first light source 4101 is attached. Further, the light source cooling section 6B is disposed so that the flow channel through which the liquid refrigerant flows overlaps the plurality of solid-state light sources SS (the plurality of second light emitting elements) of the second light source 4102 when viewing the light source cooling section 6B from an opposite side to the side on which the second light source 4102 is attached.

The groove part 637 is formed at a position surrounding the recessed part 634, and the seal member 624 is disposed in the groove part 637 when the first member 61 and the second member 63 are combined with each other.

The inflow section 638 is located on the +M direction side of the second member 63, and in a roughly central area in the +L direction. The outflow section 639 is located on the -M direction side of the second member 63, and in a roughly central area in the +L direction. The inflow section 638 and the outflow section 639 are each formed to have a cylindrical shape. A through hole 6381 provided to the inflow section 638 and a through hole 6391 provided to the outflow section 639 each communicate the outside of the second member and the inside of the recessed part 634 with each other.

Among these sections, the inflow section 638 is connected to the connection member CN2 (see FIG. 4) described above, and makes the liquid refrigerant flowing through the light source cooling section 6 flow inside. Specifically, the third refrigerant RE3 having flowed through the third heat exchanger 533 flows into the recessed part 634 via the inflow section 638. Further, the outflow section 639 is connected to the connection member CN3 described above, and makes the liquid refrigerant having flowed through the light source cooling section 6 outflow to the outside. Specifically, the third refrigerant RE3 having flowed inside the recessed part 634 is made to outflow to the second radiator 534 via the outflow section 639.

Flow Channel of Liquid Refrigerant in Light Source Cooling Section

Figure 10:
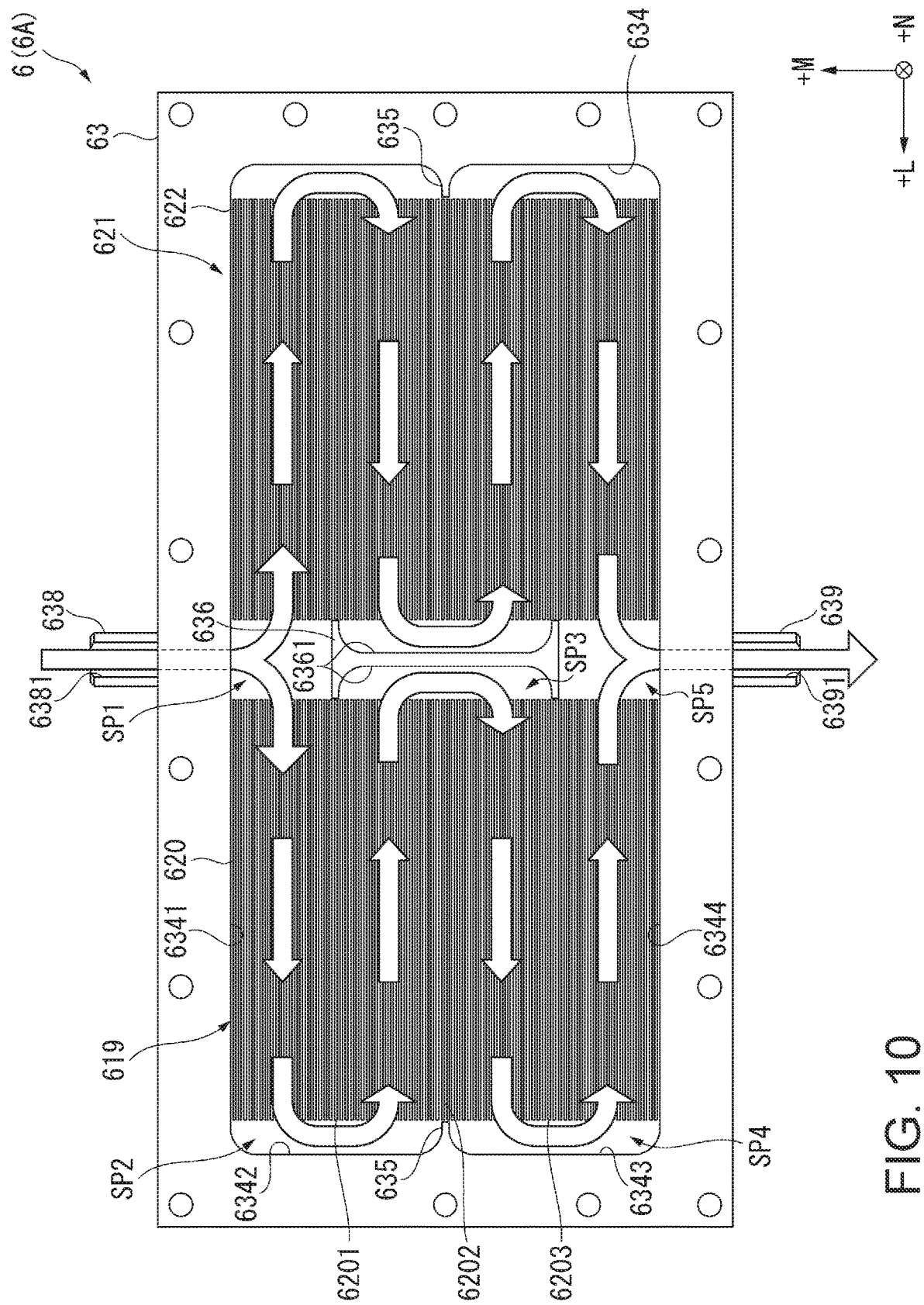
FIG. 10 is a diagram showing flow channels of a liquid refrigerant in the light source cooling section in the embodiment mentioned above.

FIG. 10 is a diagram showing the flow channel of the liquid refrigerant (the third refrigerant RE3) formed inside the light source cooling section 6. Specifically, FIG. 10 is a diagram of a state in which the fins 619, 621 described above are arranged inside the recessed part 634 viewed from the +N direction side.

When the first member 61 and the second member 63 are combined with each other, as shown in FIG. 10, the projection parts 635, 636 formed inside the recessed part 634 and the first fin 619 and the second fin 621 arranged inside the recessed part 634 have contact with each other to form the flow channel of the liquid refrigerant inside the recessed part 634. The flow channel is a flow channel through which the liquid refrigerant having flowed into the recessed part 634 via the inflow section 638 is divided into the liquid refrigerant flowing through the first fin 619 and the liquid refrigerant flowing through the second fin 621 in a space SP1 located between the first fin 619 and the second fin 621, and located closer to the inflow section 638 with respect to the projection part 636, then flows between the fin elements 620 and between the fin elements 622 while reversing the flow direction a plurality of times, and is then discharged outside the light source cooling section 6 via the outflow section 639. In other words, the flow channel forming section described above provided to the light source cooling section 6 forms a meandering flow channel through which the liquid refrigerant flows from the inflow section 638 toward the outflow section 639.

The flow channel of the liquid refrigerant flowing through the first fin 619 will be described in detail.

Among the plurality of fin elements 620 constituting the first fin 619, one fin element 6201 has contact with an end part located on the +M direction side and +L direction side of the projection part 636 described above in an end part located on the -L direction side. Therefore, some of the liquid refrigerant having flowed into the space SP1 described above from the inflow section 638 flows through the first fin 619.

The liquid refrigerant flows between the fin elements 620 located between the inner surface 6341 on the +M direction side and the fin element 6201 in the +L direction in the recessed part 634. Then, the liquid refrigerant inflows into a space SP2 between the inner surface 6342 located on the +L direction side and on the +M direction side with respect to the projection part 635 out of the inner surfaces of the recessed part 634, and an end part on the +L direction side in the first fin 619.

Here, the tip of the projection part 635 has contact with the end part on the +L direction side in the fin element 6202 located on the -M direction side from the fin element 6201. Therefore, the liquid refrigerant having flowed into the space SP2 cannot flow in the -M direction, but is guided by the inner surface 6342 having an arc-like shape to spaces between the fin elements 620 disposed between the fin elements 6201, 6202, and flows between the fin elements 620 in the -L direction. In other words, the flow direction of the liquid refrigerant is reversed.

Subsequently, the liquid refrigerant flows into a space SP3 between the concave part 6361 formed on the +L direction side in the projection part 636 and an end part on the -L direction side in the first fin 619. An end part located on the +L direction side and on the -M direction side in the projection part 636 has contact with an end part on the -L direction side in the fin element 6203 located on the -M direction side from the fin element 6202. Therefore, the liquid refrigerant having flowed into the space SP3 cannot flow in the -M direction, but is guided by the concave part 6361 having an arc-like shape to spaces between the fin elements 620 disposed between the fin elements 6202, 6203, and flows between the fin elements 620 in the +L direction. In other words, the flow direction of the liquid refrigerant is reversed once again.

Then, the liquid refrigerant inflows into a space SP4 between the inner surface 6343 located on the +L direction side and on the -M direction side with respect to the projection part 635 out of the inner surfaces of the recessed part 634, and an end part on the +L direction side in the first fin 619.

The liquid refrigerant having flowed into the space SP4 is reversed in flow direction once again by the inner surface 6343, then flows in the -L direction between the fin elements 620 disposed between the fin element 6203 and the inner surface 6344 on the -M direction side in the recessed part 634, and then flows into a space SP5 located on the -M direction side with respect to the projection part 636.

The liquid refrigerant having flowed into the space SP5 is discharged outside the light source cooling section 6 via the outflow section 639, and then flows into the second radiator 534 via the connection member CN3 (see FIG. 4) connected to the outflow section 639.

As described hereinabove, the flow channel forming section described above for forming the meandering flow channel reverses the flow direction of the liquid refrigerant flowing inside the light source cooling section 6 three times.

It should be noted that the liquid refrigerant flowing into the space SP1 and then flowing through the second fin 621 also flows into the space SP5 described above through the flow channel line symmetric with the flow channel of the liquid refrigerant flowing through the first fin 619 about the center line connecting the inflow section 638 and the outflow section 639. Then, the liquid refrigerant having flowed into the space SP5 is merged with the liquid refrigerant having flowed through the first fin 619 described above, and is then discharged outside from the outflow section 639.

Temperature Distribution in Light Source Cooling Section and Light Source Array and Illuminance Distribution in Source Light The liquid refrigerant having flowed into the light source cooling section 6 flows while the flow direction is reversed three times in each of the first fin 619 and the second fin 621, and is then discharged from the outflow section 639 after the heat having been transferred from the light source array SA to the light source cooling section 6 is transferred to the liquid refrigerant.

Further, since the heat from the light source array SA is transferred to the liquid refrigerant while flowing between the fin elements 620 of the first fin 619 and between the fin elements 622 of the second fin 621, the temperature of the liquid refrigerant rises. Specifically, the liquid refrigerant flowing through each of the fins 619, 621 rise in temperature as the liquid refrigerant proceeds toward the −M direction, and the cooling efficiency by the liquid refrigerant also drops as the liquid refrigerant proceeds toward the −M direction.

Therefore, the temperature of the solid-state light sources constituting the light source array SA rises in a direction from the +M direction side toward the −M direction side. Therefore, a temperature difference occurs in the light source array SA of the first light source 4101 along the −M direction due to the cooling by the liquid refrigerant. Similarly, a temperature difference occurs in the light source array SA of the second light source 4102 along the −M direction due to the cooling by the liquid refrigerant. In still other words, the temperature (luminance) in the light source array SA is biased in a predetermined direction.

Here, as described above, a solid-state light source such as an LD has a characteristic that the emission luminance is high at low temperature and is low at high temperature.

Therefore, in the source light emitted from the first light source 4101, the luminance (illuminance) drops toward the −M direction. Further, since the second light source 4102 also has the same configuration as that of the first light source 4101, in the source light emitted from the second light source 4102, the luminance (illuminance) also drops toward the −M direction. In other words, an illuminance distribution (bias of the luminance) occurs in the source light emitted from the first light source 4101 due to the temperature difference described above in the plurality of solid-state light sources SS in the first light source 4101. Similarly, an illuminance distribution (bias of the luminance) occurs in the source light emitted from the second light source 4102 due to the temperature difference described above in the plurality of solid-state light sources SS in the second light source 4102.

Arrangement of First Light Source and Second Light Source

Figure 11:
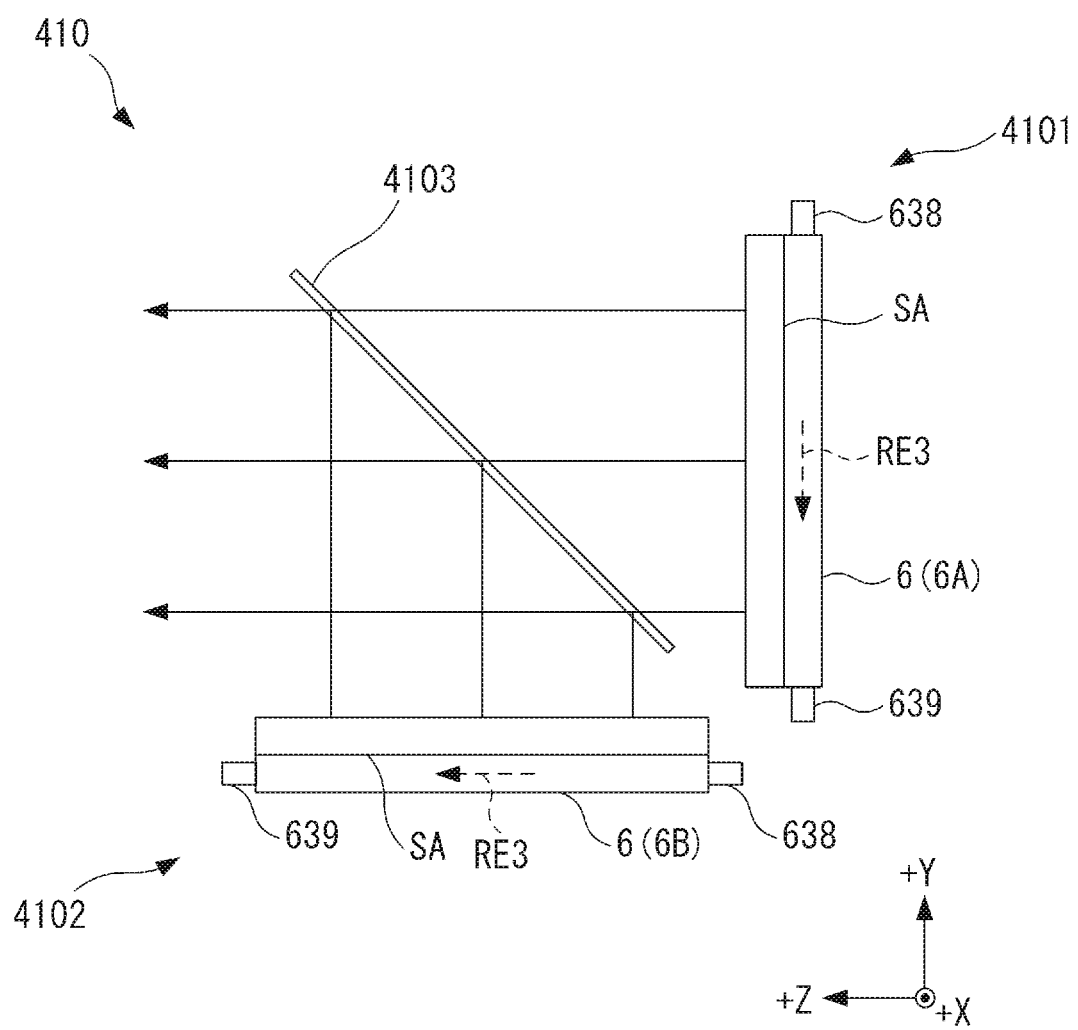
FIG. 11 is a diagram showing an arrangement of a first light source and a second light source in the embodiment mentioned above.

FIG. 11 is a diagram showing an arrangement of the first light source 4101 and the second light source 4102.

In light of the above, in the present embodiment, these light sources 4101, 4102 are arranged so that the illuminance distribution (the luminance distribution) of the source light emitted from the first light source 4101 and the illuminance distribution (the luminance distribution) of the source light emitted from the second light source 4102 are canceled out each other in the light combining member 4103.

Specifically, in the light source section 410, as shown in FIG. 11, the first light source 4101 is disposed so that the +L direction in the first light source 4101 becomes parallel to the +X direction, the +M direction side becomes the +Y direction side, and the +N direction side becomes the +Z direction side. Further, the second light source 4102 is disposed so that the +L direction in the second light source 4102 becomes parallel to the +X direction, the +M direction side becomes the −Z direction side, and the +N direction side becomes the +Y direction side.

In the arrangement of the first light source 4101 and the second light source 4102 shown in FIG. 11, the temperature difference caused in the light source array SA of the first light source 4101 by the liquid refrigerant increases along the −Y direction (a first direction). Further, the temperature difference caused in the light source array SA of the second light source 4102 by the liquid refrigerant increases along the +Z direction (a second direction). In other words, the light source cooling section 6A cools the plurality of solid-state light sources SS (the plurality of first light emitting elements) of the first light source 4101 using the flow channel of the liquid refrigerant flowing inside the light source cooling section 6A so that the temperature difference increases in the −Y direction (the first direction). In other words, the light source cooling section 6A causes the temperature difference increasing in the −Y direction (the first direction) in the plurality of solid-state light sources SS of the first light source 4101 using the flow channel of the liquid refrigerant flowing inside the light source cooling section 6A. Further, the light source cooling section 6B cools the plurality of solid-state light sources SS (the plurality of second light emitting elements) of the second light source 4102 using the flow channel of the liquid refrigerant flowing inside the light source cooling section 6B so that the temperature difference increases in the +Z direction (the second direction). In other words, the light source cooling section 6B causes the temperature difference increasing in the +Z direction (the second direction) in the plurality of solid-state light sources SS of the second light source 4102 using the flow channel of the liquid refrigerant flowing inside the light source cooling section 6B.

Thus, the light in an area high in luminance (illuminance) in the source light emitted from the first light source 4101 is on the +Y direction side in the light combining member 4103, and enters a region (a first region) located on the +Z direction side, and further, the light in an area low in luminance is on the −Y direction side in the light combining member 4103, and enters a region (a second region) located on the −Z direction side.

In contrast, the light in an area high in luminance in the source light emitted from the second light source 4102 is on the −Y direction side in the light combining member 4103, and enters the region (the second region) located on the −Z direction side, and further, the light in an area low in luminance is on the +Y direction side, and enters the region (the first region) located on the +Z direction side.

Due to such an arrangement of the first light source 4101 and the second light source 4102, the light in the area high in luminance emitted from the first light source 4101 and the light in the area low in luminance emitted from the second light source 4102 are combined with each other by the light combining member 4103 in the first region of the light combining member 4103. Further, in the second region of the light combining member 4103, the light in the area low in luminance emitted from the first light source 4101 and the light in the area high in luminance emitted from the second light source 4102 are combined with each other. Then, thus, the illuminance distributions (the luminance distributions) of the respective source light are canceled out each other in the light combining member 4103. In other words, the biases in brightness of the respective source light are canceled out each other in the light combining member 4103.

Therefore, the source light having the roughly homogenized illuminance distribution is emitted from the light combining member 4103. Further, according to this configuration, the deterioration such as a luminance variation is prevented from occurring in the projection image.

Configuration of Control Device

Figure 12:
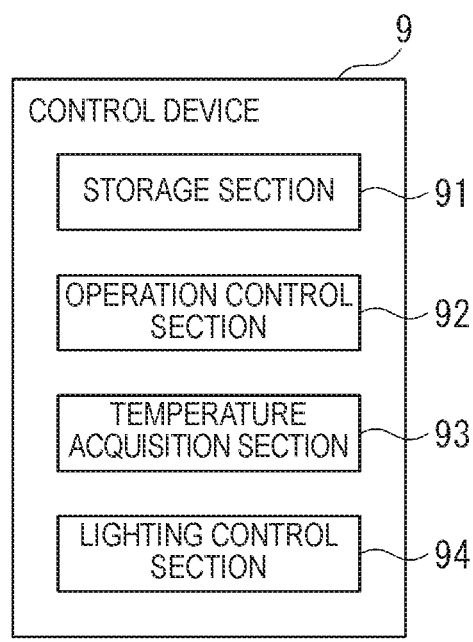
FIG. 12 is a block diagram showing a configuration of a control device in the embodiment mentioned above.

FIG. 12 is a block diagram showing a configuration of the control device 9.

The control device 9 has a processing circuit such as a central processing unit (CPU) and a storage circuit such as a memory, and controls the overall operation of the projector 1 as described above. For example, the control device 9 processes the image information input to the control device 9 to output the image signal corresponding to the image information to the light modulation devices 472 described above to thereby make the image forming device 42 form the image corresponding to the image information. Further, the control device 9 controls operations of the cooling device 5 and the light source device 41. As shown in FIG. 12, such a control device 9 has a storage section 91, an operation control section 92, a temperature acquisition section 93 and a lighting control section 94.

The storage section 91 stores programs and data necessary for the operation of the projector 1. For example, the storage section 91 stores a comparison value (a predetermined value) to be compared by the lighting control section 94 with the temperature of each of the light source modules SM of the light sources 4101, 4102 to control a drive current to be supplied to that light source module SM.

The operation control section 92 controls the operations of the image forming device 42 and the cooling device 5.

The temperature acquisition section 93 obtains the temperature detected by the temperature detection section Th1 provided to each of the light source modules SM, namely the temperature of each of the light source modules SM. Further, the temperature acquisition section 93 obtains the temperature detected by a temperature detection section Th2 described later, namely the temperature of the third refrigerant RE3. The operation control section 92 controls the operation of the cooling device 5 using the temperature of the third refrigerant RE3 as one of control conditions.

The lighting control section 94 supplies the drive current to each of the light source modules SM of the first light source 4101 and the second light source 4102 to light the light source modules SM of the first light source 4101 and the second light source 4102. More specifically, the lighting control section 94 control the current value of the drive current to be supplied to each of the light source modules SM to control the lighting state of each of the light source modules SM, namely the lighting state of each of the light sources 4101, 4102. Further, the lighting control section 94 compares the temperature of each of the light source modules SM obtained by the temperature acquisition section 93 and the comparison value stored in the storage section 91 with each other. Then, in the case in which the temperature of the light source module SM is lower than the comparison value, the lighting control section 94 supplies the light source module SM with the drive current lower than the drive current to be supplied to the light source module SM in the case in which the temperature of the light source module SM is equal to or higher than the comparison value.

Here, as described above, the emission luminance of the solid-state light source SS decreases at high temperature, and increases at low temperature. Since the emission luminance of the solid-state light source SS is different between the case of high temperature and the case of low temperature, the luminance of the image formed varies with the temperature of the solid-state light source SS. Specifically, it the temperature of the solid-state light source SS rises due to the use of the projector 1, the luminance of the projection image decreases. Further, if the current value of the drive current supplied is high, the emission luminance of the solid-state light source SS increases, and if the current value is low, the emission luminance of the solid-state light source SS decreases.

For this reason, the lighting control section 94 supplies the light source module SM with the drive current low in current value in the case in which the temperature of the light source module SM is low, and supplies the light source module SM with the drive current high in current value in the case in which the temperature is high. Thus, it is possible to emit the light with a constant luminance (light intensity) from the light source module SM irrespective of the temperature of the light source module SM. Further, thus, it is possible to emit the light constant in luminance from the light source section 410, and by extension, from the light source device 41.

It should be noted that since in the present embodiment, the temperature detection section Th1 is provided to each of the light source modules SM, it is possible for the lighting control section 94 to adjust the current value of the drive current supplied for each of the light source modules SM. However, this is not a limitation, and in the case in which the temperature detection section Th1 detects the overall temperature of the light source array SA, it is possible for the lighting control section 94 to adjust the current values of the drive currents supplied to the respective solid-state light sources SS in a lump.

Insulation of Metal Component Attached to Light Source Housing

Figure 13:
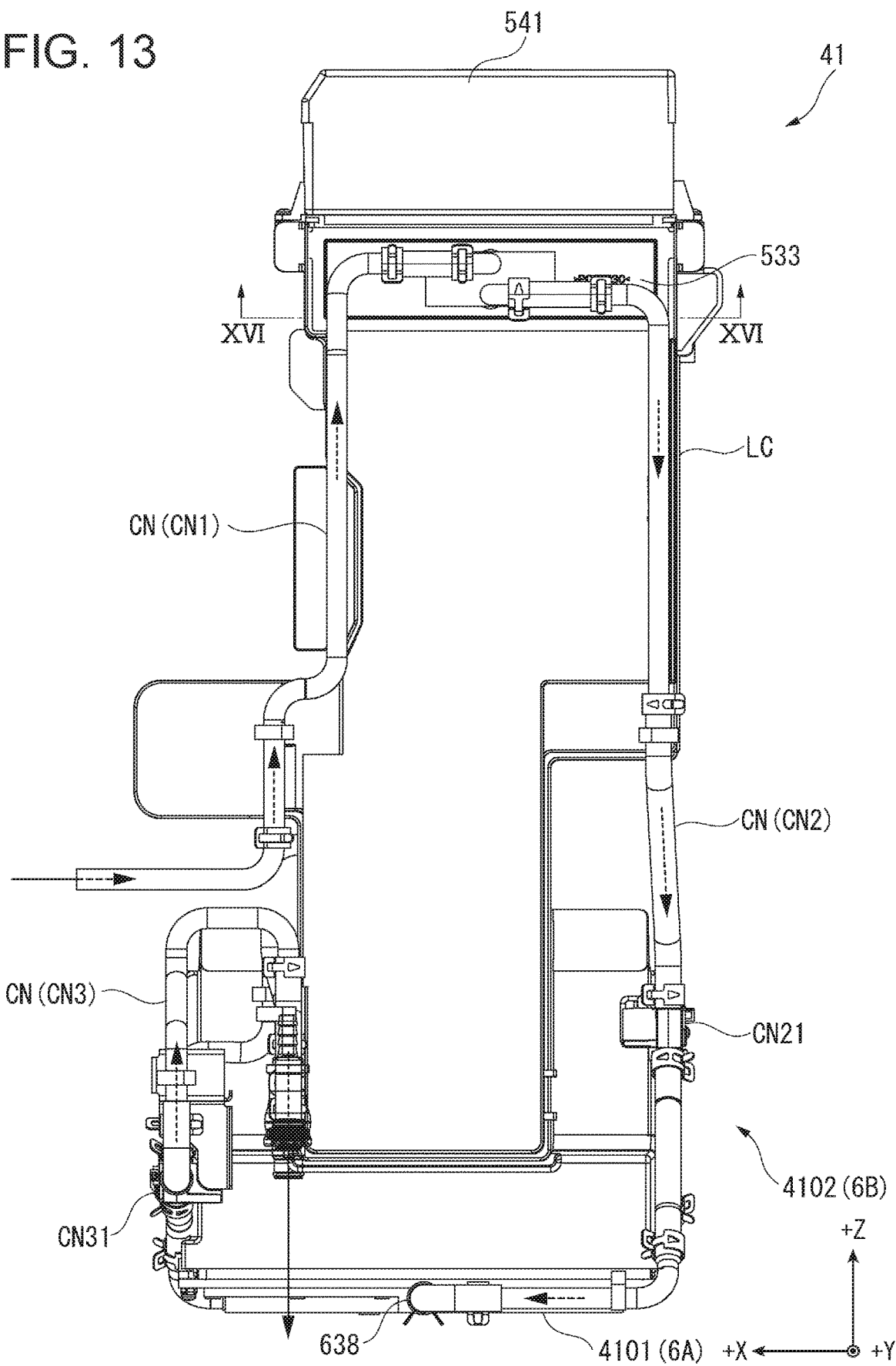
FIG. 13 is a plan view showing a light source housing and a connection member in the embodiment mentioned above.

FIG. 13 is a plane view (a diagram viewed from the +Y direction side) showing the light source housing LC as a metal housing and the connection members CN attached to the light source housing LC.

Incidentally, a lot of electronic components such as the power supply device 8 and the control device 9 are disposed inside the exterior housing 2 as described above, and each generate an electromagnetic wave. Further, if the electromagnetic wave enters a metal member connected to the ground, a current flows through the metal component although the current is faint.

As shown in FIG. 13, in the present embodiment, the two light source cooling sections 6, the third heat exchanger 533, and the flow-dividing part CN21 and the junction part CN31 provided to the connection members CN are the metal members through which the liquid refrigerant flows, and are attached to the light source housing LC.

If a current flows through these metal components, corrosion occurs on the interface between the liquid refrigerant and the metal, and by extension, there is a possibility that a leakage of the liquid refrigerant is caused. Therefore, it is conceivable that the light source housing LC made of metal is insulated from the ground to insulate not only the light source housing LC but also the light source cooling sections 6, the third heat exchanger 533, the flow-dividing part CN21 and the junction part CN31.

However, in the case of insulating the light source housing LC relatively large in size, the insulating area grows in size, and thus, the image projection device 4, and by extension, the projector 1 is apt to grow in size, and further, the insulating process is apt to become cumbersome.

In contrast, in the present embodiment, the light source cooling sections 6, the third heat exchanger 533, the flow-dividing part CN21 and the junction part CN31 are fixed in the state of being individually insulated from the light source housing LC.

The insulation of the light source cooling sections 6, the third heat exchanger 533, the flow-dividing part CN21 and the junction part CN31 with respect to the light source housing LC will hereinafter be described.

Insulation of Light Source Cooling Sections

Figure 14:
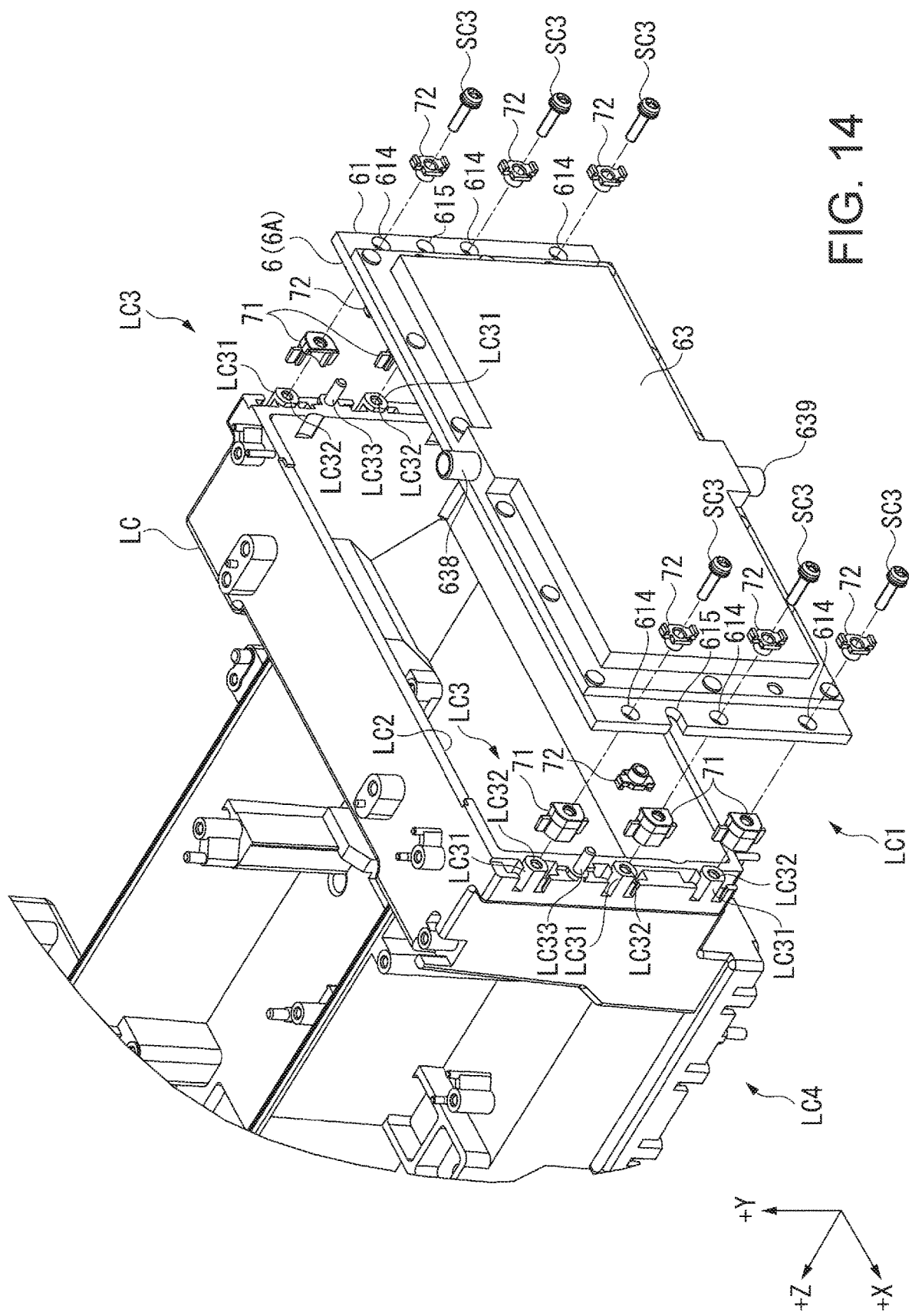
FIG. 14 is a perspective view showing a state in which the light source cooling section is separated from the light source housing in the embodiment mentioned above.

FIG. 14 is a perspective view showing a state in which the light source cooling section 6 (6A) is separated from the light source housing LC. In other words, FIG. 14 is a perspective view showing an attachment structure of the light source cooling section 6 (6A) to the light source housing LC.

As shown in FIG. 14, the light source housing LC has a first light source placement part LC1 in which the first light source 4101 is disposed in an end part on the −Z direction side, and has a second light source placement part LC4 in which the second light source 4102 is disposed in an end part on the −Y direction side and on the −Z direction side. The second light source placement part LC4 has substantially the same configuration as that of the first light source placement part LC1, and therefore, the detailed description thereof will be omitted.

The first light source placement part LC1 has an opening part LC2 having a rectangular shape in which the light source array SA of the first light source 4101 is disposed, and an attachment part LC3 in each of regions located on the +X direction side and the −X direction side in an end edge of the opening part LC2.

The attachment part LC3 has bosses LC31 each having a screw hole LC32, and a positioning projection LC33 projecting toward the −Z direction. The light source cooling section 6 is attached to such attachment parts LC3 via a plurality of insulating members 71, 72. Therefore, the first light source 4101 and the light source cooling section 6A, and the second light source 4102 and the light source cooling section 6B are each insulated from the light source housing LC. It should be noted that these light source cooling sections 6A, 6B each correspond to an insulation target through which the liquid refrigerant flows, and which is insulated from the light source housing LC.

Figure 15:
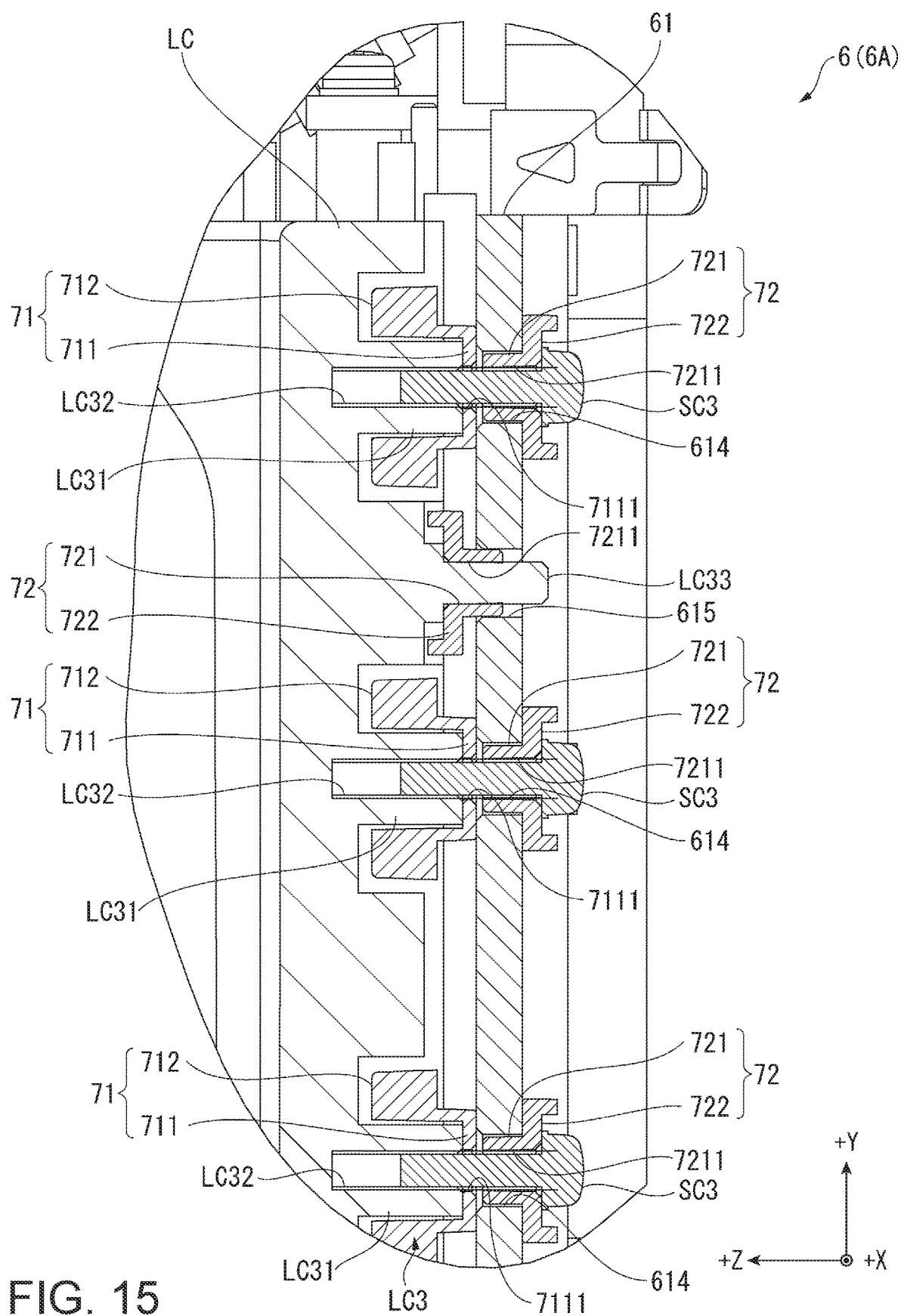
FIG. 15 is a cross-sectional view showing an attachment section and the light source cooling section in the embodiment mentioned above.

FIG. 15 is a cross-sectional view showing the attachment part LC3, and the light source cooling section 6 attached to the attachment part LC3.

The insulating members 71 are each for insulating the light source cooling section 6 (the first member 61) from the light source housing LC, and are each formed of an insulating material such as rubber. As shown in FIG. 15, the insulating members 71 each have an insulating part 711 intervening between the boss LC and the first member 61 so as to cover an end surface on the −Z direction side of the boss LC31, and a cover part 712 extending from the peripheral edge of the insulating part 711 toward the +Z direction to have a cylindrical shape so as to cover the side surface of the boss LC31. Among these sections, the insulating part 711 is provided with a hole part 7111 through which a shaft part of the screw SC3 to be fixed to the screw hole LC 32 of the boss LC31 is inserted. In other words, the insulating members 71 are disposed between the two light source cooling sections 6A, 6B as the insulation targets and the light source housing LC. It should be noted that the insulating members 71 each correspond to a first insulating member.

Due to such insulating members 71, the insulation between the boss LC31 and the first member 61, namely the insulation between the light source housing LC and the light source cooling section 6, is achieved.

The insulating members 72 each have a first insulating part 721 having a cylindrical shape, and a second insulating part 722 spreading from an end of the first insulating part 721 outward in the radial direction. Further, the insulating members 72 are provided to the respective hole parts 614 of the light source cooling section 6 as the insulation target. The first insulating part 721 in the insulating member 72 provided to the hole part 614 is provided with a hole part 7211 through which the shaft part of the screw SC3 for attaching the light source cooling section 6 as the insulation target to the light source housing LC is inserted. In other words, the insulating member 72 is disposed between the screw SC3 and the light source cooling section 6. It should be noted that the screws SC3 each correspond to an attachment member. Further, the insulating members 72 each correspond to a second insulating member.

As described above, in the case in which the insulating member 72 is provided to the hole part 614, the insulating member 72 is disposed so that the first insulating part 721 is inserted in the hole part 614, and the second insulating part 722 is located between the first member 61 and a head part of the screw SC3. Thus, the insulation between the shaft part of the screw SC3 to be fixed to the boss LC31 and the inner surface of the hole part 614, and by extension, the insulation between the light source housing LC and the light source cooling section 6 can be achieved.

Further, the insulating member 72 is also provided to each of the positioning holes 615 in the state of facing to an opposite direction to the direction in the state of being provided to the hole part 614. The positioning projection LC33 provided to the light source housing LC to position the light source cooling section 6 is inserted through a hole part 7211 in the insulating member 72 provided to the positioning hole 615. In other words, the insulating member 72 is disposed between the positioning projection LC33 of the light source housing LC and the inner surface of the positioning hole 615 of the light source cooling section 6. Each of the insulating members 72 also corresponds to a third insulating member.

In the case in which the insulating member 72 is provided to the positioning hole 615 as described above, the insulating member 72 is disposed so that the first insulating part 721 covers the side of the positioning projection LC33, and has contact with a base end part of the positioning projection LC33. Thus, the insulation between the side surface of the positioning projection LC33 and the inner surface of the positioning hole 615, and by extension, the insulation between the light source housing LC and the light source cooling section 6 can be achieved.

Insulation of Third Heat Exchanger

Figure 16:
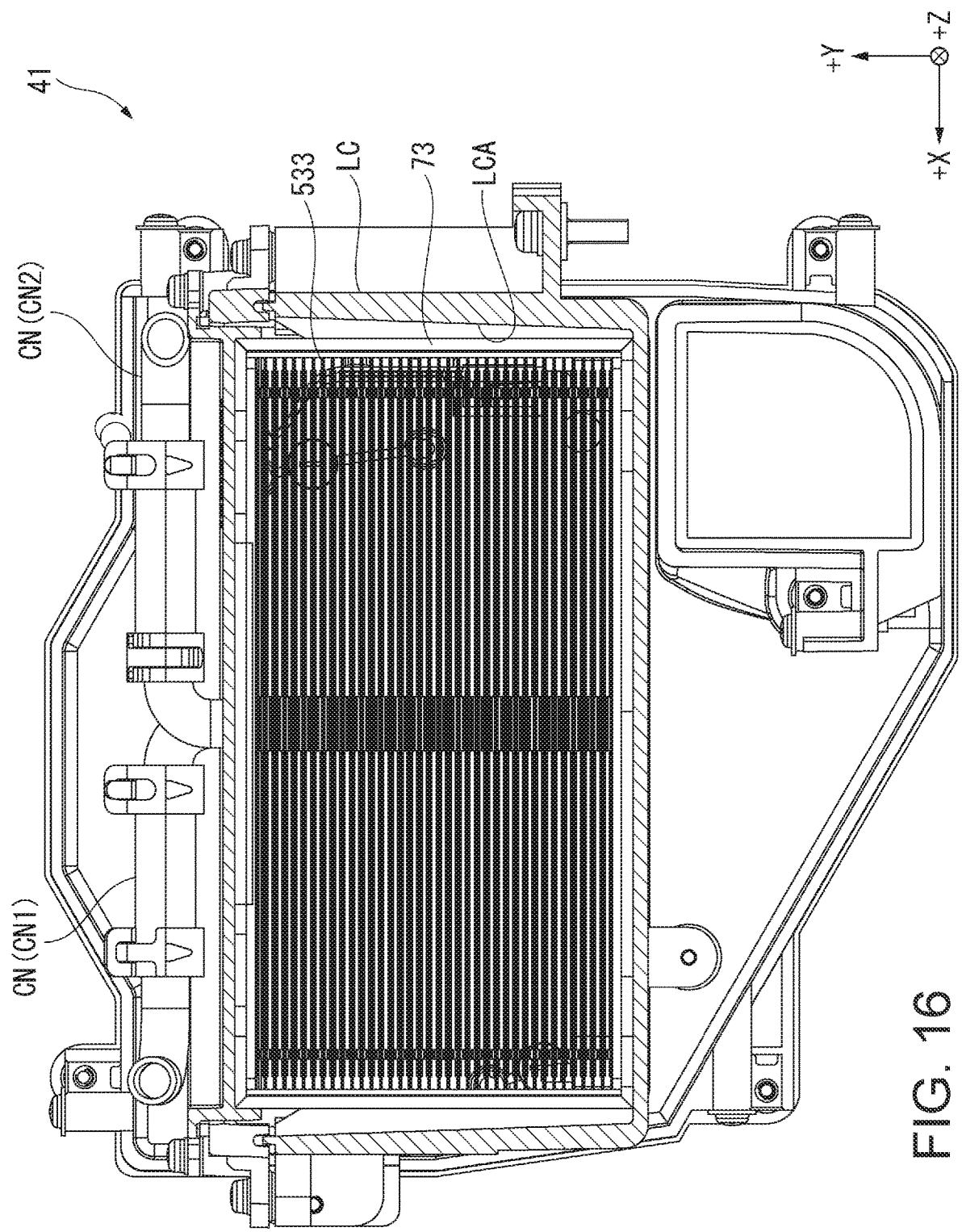
FIG. 16 is a diagram showing a third heat exchanger and an insulating member in the embodiment mentioned above.

FIG. 16 is a diagram showing the third heat exchanger 533 disposed inside the light source housing LC, and an insulating member 73 provided to the third heat exchanger 533. In other words, FIG. 16 is a cross-sectional view of the light source device 41 along the line XVI–XVI in FIG. 13.

On the periphery of the third heat exchanger 533 disposed inside the light source housing LC, there are disposed the insulating members 73 as shown in FIG. 16. Specifically, the insulating members 73 are disposed on the side surfaces on the ±X direction side and the side surfaces on the ±Y direction side, respectively, in the third heat exchanger 533 having a roughly rectangular shape viewed from the −Z direction side. In other words, the insulating member 73 is disposed between the light source housing LC and the third heat exchanger 533, and further, the third heat exchanger 533 is insulated from the light source housing LC. It should be noted that the third heat exchanger 533 corresponds to the insulation target through which the liquid refrigerant flows, and which is insulated from the light source housing LC. Further, the insulating members 73 each correspond to a first insulating member.

The insulating members 73 prevent the third heat exchanger 533 made of metal and the inner surfaces LCA of the light source housing LC from having direct contact with each other to thereby insulate the third heat exchanger 533 from the light source housing LC. Such insulating members 73 are each formed of an insulating material such as rubber or resin.

Insulation of Flow-dividing Part and Junction Part

Figure 17:
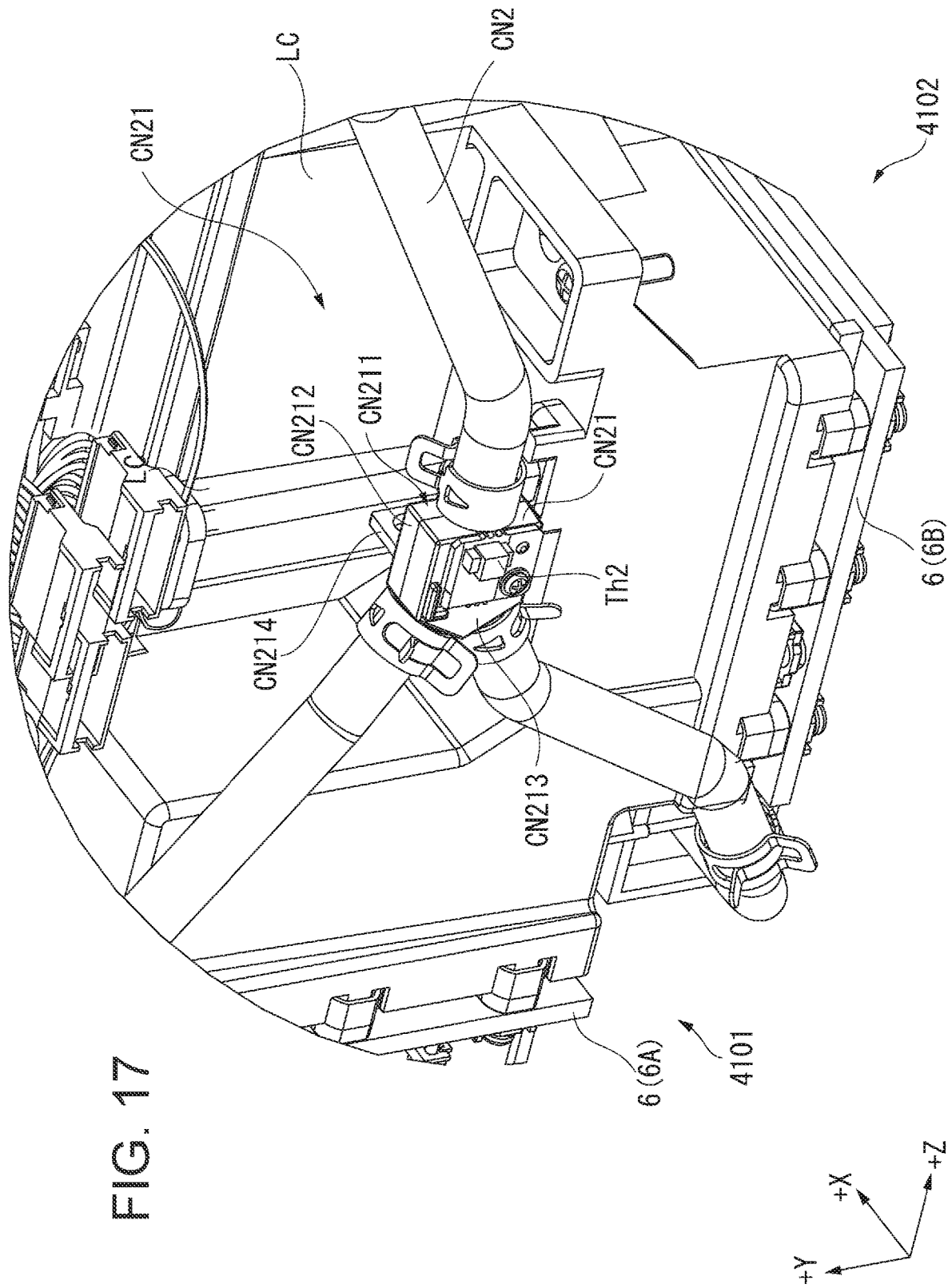
FIG. 17 is a perspective view showing a flow-dividing part in the embodiment mentioned above.

FIG. 17 is a perspective view showing the flow-dividing part CN21.

As shown in FIG. 17, the flow-dividing part CN21 is disposed in the connection member CN2 disposed along the side surface on the −X direction side of the light source housing LC. The flow-dividing part CN21 has a joint part CN211 as a trifurcating joint for distributing the third refrigerant RE3 flowing from the third heat exchanger 533 to the light source cooling sections 6A, 6B corresponding to the light sources 4101, 4102, and a cover part CN212 for covering the joint part CN211, and is formed of metal. In other words, the flow-dividing part CN21 is provided to the light source housing LC, and further divides the liquid refrigerant (the third refrigerant RE3) flowing inside the flow-dividing part CN21 to flow into the light source cooling section 6A and the light source cooling section 6B as also shown in FIG. 4.

Figure 18:
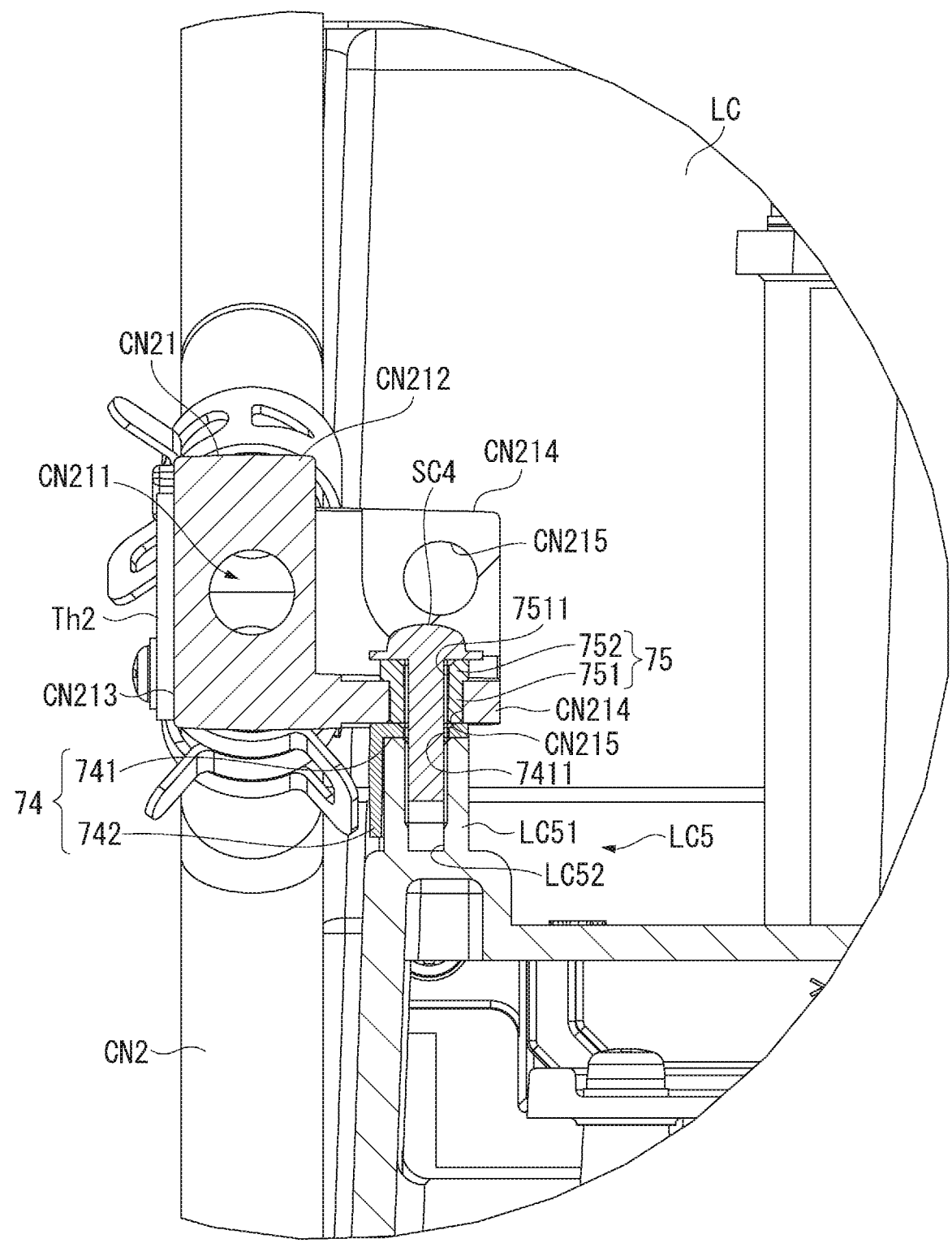
FIG. 18 is a cross-sectional view showing the flow-dividing part in the embodiment mentioned above.

FIG. 18 is a diagram showing a cross-section of the flow-dividing part CN21 along the X–Y plane.

Among these parts, the cover part CN212 has an attachment part CN213 formed flatly, and two fixation parts CN214 for fixing the flow-dividing part CN21 to the light source housing LC as shown in FIG. 17 and FIG. 18.

To the attachment part CN213, there is attached the temperature detection section Th2 for detecting the temperature of the third refrigerant RE3 flowing inside the joint part CN211. The temperature detection section Th2 also outputs the temperature detected to the control device 9 described above.

One of the two fixation parts CN214 is formed like a flat plate parallel to the X–Z plane, and the other thereof is formed like a flat plate parallel to the X–Y plane. Further, each of the fixation parts CN214 is provided with a hole part CN215 through which a screw SC4 for attaching and fixing the flow-dividing part CN21 to the light source housing LC is inserted. Either of these fixation parts CN214 is used when fixing the flow-dividing part CN21 to the light source housing LC. It should be noted that the screw SC4 corresponds to an attachment member.

Here, the light source housing LC is provided with a fixation part LC5 to which the flow-dividing part CN21 described above is fixed. The fixation part LC5 has a boss LC51 rising toward the +Y direction. Further, the boss LC51 is provided with a screw hole LC52 to which the screw SC4 is fixed.

When the flow-dividing part CN21 is fixed to such a fixation part LC5, insulating members 74, 75 intervene between the boss LC51 and the fixation part CN214 as shown in FIG. 18.

Similarly to the insulating member 71 described above, the insulating member 74 has an insulating part 741 disposed between an end surface at the tip in the projection direction in the boss LC51 and the fixation part CN214, and a cover part 742 extending from the end edge of the insulating part 741 along the rising direction of the boss LC51 to cover a part of a side surface of the boss LC51. Among these parts, the insulating part 741 is provided with a hole part 7411 through which a shaft part of the screw SC4 is inserted. In other words, the insulating member 74 is disposed between the light source housing LC and the flow-dividing part CN21, and further, the flow-dividing part CN21 is insulated from the light source housing LC. It should be noted that the flow-dividing part CN21 corresponds to the insulation target through which the liquid refrigerant flows, and which is insulated from the light source housing LC. Further, the insulating member 74 corresponds to the first insulating member.

Due to such an insulating member 74, the insulation between the boss LC51 and the fixation part CN214, namely the insulation between the light source housing LC and the flow-dividing part CN21, is achieved.

The insulating member 75 is provided to the hole part CN215. The insulating member 75 has a first insulating part 751 having a cylindrical shape, and a second insulating part 752 spreading from an end part on the +Y direction side of the first insulating part 751 outward in the radial direction. Among these, the first insulating part 751 is provided with a hole part 7511 through which a shaft part of the screw SC4 is inserted. In other words, the insulating member 75 is disposed between the screw SC4 and the flow-dividing part CN21. It should be noted that the insulating member 75 corresponds to the second insulating member.

Due to such an insulating member 75, the insulation between the head part of the screw SC4 and the inner surface of the hole part CN215, and by extension the insulation between the light source housing LC and the flow-dividing part CN21, is achieved.

It should be noted that although not shown in the drawings, the junction part CN31 shown in FIG. 13 also has substantially the same configuration as that of the flow-dividing part CN21 described above. Further, the light source housing LC also has a fixation part to which the junction part CN31 is fixed, and the fixation part has substantially the same configuration as that of the fixation part LC5 described above. Further, when fixing the junction part CN31 to the fixation part, the insulating members 74, 75 described above are used to achieve the insulation of the junction part CN31 from the light source housing LC.

Specifically, the junction part CN31 is provided to the light source housing LC, and further, merges the liquid refrigerant having flowed through the light source cooling section 6A and the liquid refrigerant having flowed through the light source cooling section 6B with each other as also shown in FIG. 4. Further, the first insulating member is disposed between the light source housing LC and the junction part CN31, and further, the junction part CN31 is insulated from the light source housing LC. It should be noted that the junction part CN31 corresponds to the insulation target through which the liquid refrigerant flows, and which is insulated from the light source housing LC. Further, the second insulating member is disposed between the screw as the attachment member and the junction part CN31.

Advantages of Embodiment

The projector 1 according to the present embodiment described hereinabove has the following advantages.

The cooling device 5 has the light source cooling section 6A (the first cooling section) for cooling the plurality of solid-state light sources SS (the first light emitting elements) of the first light source 4101 so that the temperature difference increases in the −Y direction (the first direction) due to the third refrigerant RE3 flowing inside, and the light source cooling section 6B (the second cooling section) for cooling the plurality of solid-state light sources SS (the second light emitting elements) of the second light source 4102 so that the temperature difference increases in the +Z direction (the second direction) due to the third refrigerant RE3 flowing inside. Further, the first light source 4101 and the second light source 4102 are arranged so that the illuminance distribution caused by the temperature difference in the plurality of solid-state light sources SS of the first light source 4101 and the illuminance distribution caused by the temperature difference in the plurality of solid-state light sources SS of the second light source 4102 are canceled out each other.

According to this configuration, it is possible to make the source light having been emitted from the light sources 4101, 4102, and then combined with each other by the light combining member 4103 be a light beam having a roughly homogenized illuminance distribution. Therefore, it is possible to prevent the luminance variation from occurring in the projection image formed by modulating the illumination light generated from the source light, and it is possible to prevent the projection image from deteriorating.

The light source cooling section 6A is disposed so that the flow channel of the third refrigerant RE3 in the light source cooling section 6A overlaps the plurality of solid-state light sources SS arranged in the light source array SA when viewed from the opposite side to the emission side of the light by the first light source 4101. The light source cooling section 6B is also disposed similarly with respect to the second light source 4102. According to this configuration, it is possible to make it easy to transfer the heat of the plurality of solid-state light sources SS arranged in the light source array SA constituting the first light source 4101 to the third refrigerant RE3 flowing through the flow channel inside the light source cooling section 6A. Similarly, it is possible to make it easy to transfer the heat of the plurality of solid-state light sources SS arranged in the light source array SA constituting the second light source 4102 to the third refrigerant RE3 flowing through the flow channel inside the light source cooling section 6B. Therefore, it is possible to effectively cool the solid-state light sources SS.

In the light source cooling section 6A, the temperature difference increasing in the −M direction is caused in the solid-state light sources SS of the first light source 4101 by the flow channel of the third refrigerant RE3 formed inside. The same applies to the light source cooling section 6B.

According to this configuration, it is possible to cause the temperature difference described above by the flow channel of the third refrigerant RE3 inside the light source cooling sections 6A, 6B. Therefore, it is possible to reliably generate the illuminance distributions described above in the light beams emitted from the respective light sources 4101, 4102.

The light source cooling sections 6A, 6B each have the inflow section 638 for making the third refrigerant RE3 inflow to the inside, the outflow section 639 for making the third refrigerant RE3 having flowed through the light source cooling section 6 outflow, and the recessed part 634, the projection parts 635, 636 and fins 619, 621 as the flow channel forming section for forming the flow channel of the third refrigerant RE3 meandering from the inflow section 638 toward the outflow section 639.

According to this configuration, since the flow channel of the third refrigerant RE3 inside the light source cooling sections 6A, 6B is meandering, it is possible to elongate the flow channel, and thus, it is possible to cause the temperature difference in the third refrigerant RE3 between the upstream side and the downstream side of the flow channel, and by extension, the temperature difference increasing in the direction from the inflow section 638 toward the outflow section 639, in the plurality of solid-state light sources SS while sufficiently cooling the corresponding one of the first light source 4101 and the second light source 4102. Therefore, it is possible to cancel out the illuminance distributions described above using the simplified arrangement described above of the first light source 4101 and the second light source 4102, it is possible to emit the source light having the roughly homogenized illuminance distribution from the light source section 410, and it is possible to prevent the deterioration from occurring in the projection image described above.

In the flow channel of the third refrigerant inside each of the light source cooling sections 6A, 6B, the flow direction of the third refrigerant RE3 is reversed three times. According to this configuration, it is possible to locate the inflow section 638 and the outflow section 639 at the same position in the +L direction. Therefore, piping to the light source cooling sections 6A, 6B can easily be achieved.

The first light source 4101 and the second light source 4102 each have the light source array SA constituted by the plurality of light source modules SM, and the light source array SA is provided with the temperature detection section Th1 for detecting the temperature. Further, in the case in which the temperature of the light source array SA is lower than the comparison value, the lighting control section 94 of the control device 9 supplies the light source array SA with the drive current with the current value lower than in the case in which the temperature is equal to or higher than the comparison value to light the light source array.

According to this configuration, the variation in the emission luminance of the solid-state light sources SS with the temperature can be suppressed by the current value of the drive current supplied to the solid-state light sources SS. Therefore, since it is possible to keep the light intensity of the source light emitted from the light sources 4101, 4102 roughly constant, it is possible to suppress the luminance variation in the projection image.

The light source device 41 is provided with the light source housing LC as the metal housing to which the first light source 4101 and the second light source 4102 are fixed. Further, the light source cooling section 6A and the light source cooling section 6B as the insulation targets are each insulated from the light source housing LC. According to this configuration, even in the case in which the electromagnetic wave generated in the power supply device 8 or the control device 9 has propagated to each of the light source cooling sections 6A, 6B, it is possible to prevent the current from flowing through the light source cooling sections 6A, 6B trough which the third refrigerant flows. Therefore, it is possible to prevent the corrosion from occurring in these light source cooling sections 6A, 6B, and thus, it is possible to prevent a problem such as a leak from occurring.

The connection member CN2 through which the third refrigerant RE3 flows is provided with the flow-dividing part CN21 for dividing the third refrigerant RE3 flowing inside to make the third refrigerant RE3 flow into the light source cooling sections 6A, 6B, and the flow-dividing part CN21 is fixed to the light source housing LC in the state of being insulated as the insulation target from the light source housing LC. According to this configuration, it is possible to prevent the corrosion described above from occurring in the flow-dividing part CN21. Therefore, it is possible to prevent the leak from occurring in the flow-dividing part CN21 high in flow rate of the third refrigerant RE3.

The connection member CN3 is provided with the junction part CN31 for merging the third refrigerant RE3 flowing from the light source cooling sections 6A, 6B and then guiding the third refrigerant RE3 to the second radiator 534, and the junction part CN31 fixed to the light source housing LC in the state of being insulated as the insulation target from the light source housing LC. According to this configuration, similarly to the flow-dividing part CN21 described above, it is possible to prevent the corrosion from occurring in the junction part CN31 high in flow rate of the third refrigerant RE3, and by extension, it is possible to prevent the leak from occurring.

The third heat exchanger 533 for transferring the heat of the fourth refrigerant RE4 in the light source housing LC to the third refrigerant RE3 flowing inside to thereby cool the fourth refrigerant RE4 is disposed inside the light source housing LC in the state of being insulated as the insulation target from the light source housing LC. According to this configuration, it is possible to prevent the corrosion from occurring in the third heat exchanger 533. Therefore, it is possible to prevent the leak from occurring in the third heat exchanger 533, and by extension, it is possible to prevent the third refrigerant from being leaked in the light source housing LC which is roughly sealed. Further, since the corrosion described above can be prevented from occurring, it is possible to prevent the choke from occurring in the third heat exchanger 533, and thus it is possible to prevent the deterioration of the performance of the third heat exchanger 533.

The insulating members 71, 73, 74 as the first insulating members are respectively disposed between the light source cooling sections 6A, 6B, the third heat exchanger 533, the flow-dividing part CN21 and the junction part CN31 as the insulation targets through which the third refrigerant RE3 flows and which is insulated from the light source housing LC, and the light source housing LC. According to this configuration, it is possible to reliably insulate these insulation targets from the light source housing LC.

Among the insulation targets described above, the light source cooling sections 6A, 6B and the flow-dividing part CN21 are attached to the light source housing LC with the screws SC3, SC4 as the attachment members. Further, the insulating members 72, 75 as the second insulating members are disposed between the screws SC3 and the light source cooling sections 6A, 6B, and between the screw SC4 and the flow-dividing part CN21. According to this configuration, by disposing the insulating members 72, 75 described above, it is possible to prevent the light source housing LC, and the light source cooling sections 6A, 6B and the flow-dividing part CN21 from being electrically connected to each other via the screws SC3, SC4. Therefore, it is possible to reliably insulate the light source cooling sections 6A, 6B and the flow-dividing part CN21 from the light source housing LC.

It should be noted that since the junction part CN31 is also attached to the light source housing LC via the second insulating member similarly to the flow-dividing part CN21, substantially the same advantages as in the flow-dividing part CN21 can also be obtained in the junction part CN31.

The light source housing LC has the positioning projections LC33 for positioning the light source cooling sections 6, and the light source cooling sections 6 are each provided with the positioning holes 615 through which the positioning projections LC33 are respectively inserted. Further, between the positioning projection LC33 and the positioning hole 615, there is disposed the insulating member 72 as the third insulating member. According to this configuration, it is possible to prevent the light source housing LC and the light source cooling section 6 from being electrically connected to each other via the positioning projections LC33. Therefore, it is possible to reliably insulate the light source cooling section 6 from the light source housing LC.

Modifications of Embodiment

The invention is not limited to the embodiments described above, but includes modifications, improvements, and so on in the range where the advantages of the invention can be achieved.

In the embodiment described above, it is assumed that the first light source 4101 is disposed so as to emit the light toward the +Z direction, and the second light source 4102 is disposed so as to emit the light toward the +Y direction, and the light combining member 4103 combines the light emitted from the light source 4101 and the light emitted from the light source 4102 with each other to emit the result toward the +Z direction. However, this is not a limitation, but it is sufficient for the first light source 4101 and the second light source 4102 to be arranged so that the illuminance distributions of the light emitted from these light sources are canceled out each other in the light combining member 4103.

Further, the light source device 41 is not limited to the configuration having the two light sources, namely the first light source 4101 and the second light source 4102, but can also be provided with a configuration having three or more light sources.

In the embodiment described above, it is assumed that the third refrigerant RE3 as the liquid refrigerant flows inside the light source cooling sections 6A, 6B. However, this is not a limitation, but it is also possible for the cooling device to be configured so that the second refrigerant as the liquid refrigerant flows there.

Further, it is assumed that the third refrigerant RE3 having flowed through the third heat exchanger 533 is divided in the flow-dividing part CN21 to flow into the light source cooling sections 6A, 6B. However, this is not a limitation, but it is also possible for the liquid refrigerant to be supplied first to one of the light source cooling sections 6, and then supplied to the other of the light source cooling sections 6. It should be noted that since the liquid refrigerant having flowed through one of the light source cooling sections 6 becomes higher in temperature than the liquid refrigerant having not yet flowed through the one of the light source cooling sections 6, if the liquid refrigerant having flowed through the one of the light source cooling sections 6 is made to flow through the other of the light source cooling sections 6, the cooling efficiency of the solid-state light sources SS differs between the one of the light source cooling sections 6 and the other of the light source cooling sections 6. Therefore, it is preferable to make the liquid refrigerant having been divided flow through each of the light source cooling sections 6 as in the flow channel of the third refrigerant RE3 described above.

Further, it is also possible to make liquid refrigerants different from each other flow through the respective light source cooling sections 6A, 6B. In this case, the circulation channel of the liquid refrigerant flowing through the light source cooling section 6A and the circulation channel of the liquid refrigerant flowing through the light source cooling section 6B can be made different from each other.

In the embodiment described above, it is assumed that the flow channel of the liquid refrigerant formed inside the light source cooling section 6 is formed so as to overlap the solid-state light sources SS as the light emitting elements arranged in the light source array SA when viewed from an opposite side (the –N direction side) to the emission side of the light by the corresponding light source array SA. However, this is not a limitation, it is not necessarily required for the flow channel of the liquid refrigerant and the arrangement area of the solid-state light sources SS to overlap each other as long as all of the solid-state light sources SS can be cooled so that the temperature of all of the solid-state light sources SS is within an allowable temperature range. For example, it is also possible to form the flow channel of the liquid refrigerant so as to overlap a central part of the arrangement area of the solid-state light sources SS but not to overlap an outer edge part of the arrangement area.

In the embodiment described above, it is assumed that each of the light source cooling sections 6 cools the solid-state light sources SS of the light source array SA so that the temperature difference increases toward the –M direction as the direction in which the liquid refrigerant flows into the recessed part 634 via the inflow section 638. However, this is not a limitation, but it is also possible for the temperature difference to occur in another direction, or in two directions.

Further, the flow channel and the flow direction of the liquid refrigerant flowing through the light source cooling section 6 are not limited to the above description providing the illuminance distributions caused by the temperature difference described above of the light beams emitted from the respective light sources 4101, 4102 are canceled out each other in the light combining member 4103 due to the arrangement of the light sources 4101, 4102. Therefore, it is also possible to adopt a configuration in which at least one of the light source cooling section 6A for cooling the first light source 4101 and the light source cooling section 6B for cooling the second light source 4102 has the inflow section 638, the outflow section 639 and the flow channel forming section described above forming the meandering flow channel. Further, for example, the light source cooling section 6 can be provided with a configuration in which the fin elements 620, 622 extends along the +M direction, and thus, the flow channel of the liquid refrigerant is formed along the +M direction, and the liquid refrigerant flows in the –M direction to thereby cause the temperature difference of the solid-state light sources SS in the –M direction.

In the embodiment described above, it is assumed that the light source cooling section 6 distributes the third refrigerant RE3 as the liquid refrigerant having flowed inside from the inflow section 638 located at the center in the +L direction in the second member 63 to the first fin 619 located on the +L direction side and the second fin 621 located on the –L direction side, and then makes the third refrigerant RE3 flow through the first and second fins 619, 621. However, this is not a limitation, the number of the fins provided to the light source cooling section can be one, or more than two.

Further, it is assumed that the light source cooling devices 6A, 6B have the same configuration. However, this is not a limitation, it is also possible for the light source cooling devices 6A, 6B can be provided with respective configurations different from each other providing the temperature difference described above can be caused in the solid-state light sources SS of the corresponding light source array SA.

In the embodiment described above, it is assumed that the temperature difference (the temperature difference in the –M direction) of the solid-state light sources SS causing the illuminance distribution in the light beam emitted from each of the light sources 4101, 4102 is caused by the flow channel of the third refrigerant RE3 flowing inside the light source cooling section 6. However, this is not a limitation, and the temperature difference can also be caused by another configuration. For example, it is also possible to cause the temperature difference described above by adjusting the heat-transfer efficiency from the light source array SA to the light source cooling section 6 using a thermoelectric element such as a Peltier element instead of or in addition to the liquid refrigerant.

In the embodiment described above, it is assumed that the flow direction of the third refrigerant RE3 having flowed inside is reversed three times by the light source cooling section 6. Specifically, it is assumed that the flow direction of the third refrigerant RE3 flowing between the first fin 619 of the light source cooling section 6 is the +L direction between the fin element 620 located at the end part on the +M direction side in the first fin 619 and the fin element 6201 described above, the –L direction between the fin element 6201 and the fin element 6202, the +L direction between the fin element 6202 and the fin element 6203, and the –L direction between the fin element 6203 and the fin element 620 located at the end part on the –M direction side, and further, the flow direction is reversed three times. However, this is not a limitation, the number of the reversals in flow direction of the liquid refrigerant can be no larger than two, or no smaller than four. It should be noted that by setting the number of reversals to an odd number, it is possible to make it easy to arrange the inflow section 638 and the outflow section 639 on a straight line parallel to the –M direction. Therefore, by setting the number of reversals to an odd number equal to or larger than three, it is possible to make it easy to make the liquid refrigerant flow between the fin elements 620. It should be noted that the same applies to the second fin 621.

In the embodiment described above, it is assumed that the temperature detection section Th1 is provided to each of the light modules SM constituting the light source array SA.

However, this is not a limitation, but it is also possible for the temperature detection section Th1 to be provided to the light source array SA.

Further, it is assumed that the lighting control section 94 changes the current value of the drive current to be supplied to the light source array SA based on the detection result by the temperature detection section Th1. However, this is not a limitation, but it is not required for the lighting control section 94 to perform such lighting control, or it is also possible to perform the lighting control only on one of the light sources 4101, 4102.

In the embodiment described above, it is assumed that the light source cooling sections 6A, 6B, the third heat exchanger 533, the flow-dividing part CN21 and the junction part CN31 are insulated from the light source housing LC. However, this is not a limitation, but at least one of these constituents is not required to be insulated from the light source housing LC, and it is also possible for other constituents through which the liquid refrigerant flows to be insulated from the light source housing LC as the insulation target.

Further, it is assumed that these insulation targets are insulated from the light source housing LC using the insulating members 71 through 75. However, this is not a limitation, and the insulation can be achieved by another configuration.

Further, the configuration in which the light source housing LC has the positioning projections LC33, and the light source cooling section 6 has the positioning holes 615 is not a limitation, but it is also possible that the light source housing LC has positioning holes, and the insulation target such as the light source cooling section 6 has positioning projections. Further, it is also possible that at least one of the third heat exchanger 533, the flow-dividing part CN21 and the junction part CN31 has one of the positioning projections, and the positioning holes through which the positioning projections are respectively inserted, and the light source housing LC has the other thereof. In this case, it is also possible to make the third insulating member such as the insulating member 72 described above intervene between the positioning projections LC33 and the inner surface of the positioning holes 615.

Further, it is also possible for the third heat exchanger 533 to be attached to the light source housing LC as the metal housing with the attachment member such as a screw similarly to the light source cooling section 6, the flow-dividing part CN21 and the junction part CN31. In this case, it is also possible to prevent the light source housing LC and the third heat exchanger 533 from being electrically connected to each other via the attachment member using the second insulating members such as the insulating members 72, 75.

Besides the above, as the metal housing to which these insulation targets are attached in the insulated state, there is cited the light source housing LC. However, this is not a limitation, and the member to which the insulation targets are attached in the insulated state is not required to be the metal housing such as the light source housing LC, but can also be other metal members connected to the ground in the exterior housing.

In the embodiment described above, it is assumed that the pump for pressure-feeding to circulate the second refrigerant RE2 through the second circulation channel 52, and the pump for pressure-feeding to circulate the third refrigerant RE3 through the circulation channel 53 are the same pump 55. However, this is not a limitation, but it is also possible to individually provide the pump for pressure-feeding the second refrigerant RE2 and the pump for pressure-feeding the third refrigerant RE3 instead of the pump 55.

In the embodiment described above, it is assumed that the projector 1 is equipped with the three light modulation devices 472 (472R, 472G, and 472B). However, this is not a limitation, and the invention can also be applied to a projector equipped with two or less, or four or more light modulation devices.

In the embodiment described above, it is assumed that the image projection device 4 has the configuration and the layout shown in FIG. 2, but the configuration and the layout of the image projection device 4 can arbitrarily be changed.

In the embodiment described above, it is assumed that the light modulation devices 472 are each provided with the transmissive type liquid crystal panel 474 having the plane of incidence of light and the light emission surface different from each other. However, this is not a limitation, but it is also possible to adopt a configuration in which the light modulation device each have a reflective type liquid crystal panel having the plane of incidence of light and the light emission surface coinciding with each other. Further, it is also possible to use a light modulation device other than the liquid crystal, such as a device using a mirror device such as a digital micromirror device (DMD) providing the light modulation device is capable of modulating the incident light beam to form the image corresponding to the image information.

In the embodiment described above, it is assumed that the light source device 41 is provided with the first light source 4101 and the second light source 4102 each having the light source array SA having the plurality of solid-state light sources SS each formed of an LD arranged in an array. However, this is not a limitation, and it is also possible to adopt a configuration provided with other solid-state light sources such as light emitting diodes (LED) instead of the solid-state light sources SS each formed of the LD.

The entire disclosure of Japanese Patent Application No. 2017-206606, filed Oct. 25, 2017 is expressly incorporated by reference herein.

What is claimed is:
1. A projector comprising:
a light source device;
a light modulation device adapted to modulate light emitted from the light source device;
a projection optical device adapted to project the light modulated by the light modulation device; and
a cooling device adapted to cool the light source device,
wherein the light source device includes
a first light source in which a plurality of first light emitting elements are arranged,
a second light source in which a plurality of second light emitting elements are arranged, and
a light combining member adapted to combine light emitted from the first light source and light emitted from the second light source with each other,
wherein the cooling device includes
a first cooling section adapted to cool the plurality of first light emitting elements with a liquid refrigerant flowing through a flow channel formed inside so that a temperature difference increases in a first direction, and
a second cooling section adapted to cool the plurality of second light emitting elements with a liquid refrigerant flowing through a flow channel formed inside so that a temperature difference increases in a second direction, and wherein the first light source and the second light source are arranged so that an illuminance distribution caused by the temperature difference of the plurality of first light emitting elements and an illuminance distribution caused by the temperature difference of the plurality of second light emitting elements are canceled out in the light combining member.

2. The projector according to claim 1,
wherein the first cooling section is disposed so that the flow channel of the first cooling section overlaps the plurality of first light emitting elements when viewed from an opposite side to an emission side of the light emitted by the first light source, and
wherein the second cooling section is disposed so that the flow channel of the second cooling section overlaps the plurality of second light emitting elements when viewed from an opposite side to an emission side of the light by emitted the second light source.

3. The projector according to claim 1,
wherein the first cooling section causes the temperature difference in the first direction due to the flow channel of the first cooling section, and
wherein the second cooling section causes the temperature difference in the second direction due to the flow channel of the second cooling section.

4. The projector according to claim 1,
wherein at least one of the first cooling section and the second cooling section includes
an inflow section adapted to inflow the liquid refrigerant flowing in the at least one cooling section,
an outflow section adapted to outflow the liquid refrigerant having flowed in the at least one cooling section, and
a flow channel forming section adapted to form a flow channel meandering from the inflow section toward the outflow section.

5. The projector according to claim 4,
wherein the flow channel forming section reverses a flow direction of the liquid refrigerant an odd number of times no smaller than three times.

6. The projector according to claim 1, further comprising:
a temperature detection section adapted to detect temperature of the first light source and temperature of the second light source; and
a lighting control section adapted to supply the first light source and the second light source with a drive current to light the first light source and the second light source,
wherein in a case in which at least one of the temperature of the first light source and the temperature of the second light source is lower than a predetermined value, the lighting control section supplies the at least one light source with the drive current lower in current value than the drive current supplied to a light source in a case in which the temperature of the light source is equal to or higher than the predetermined value.

7. The projector according to claim 1, further comprising:
a metal housing to which the first light source and the second light source are fixed,
wherein the first cooling section and the second cooling section are insulated as insulation targets from the metal housing.

8. The projector according to claim 7, further comprising:
a flow-dividing part provided on the metal housing, the flow-dividing part adapted to divide flow of the liquid refrigerant flowing inside to flow into the first cooling section and the second cooling section,
wherein the flow-dividing part is insulated as the insulation target from the metal housing.

9. The projector according to claim 7, further comprising:
a junction part provided on the metal housing, the junction part adapted to merge the liquid refrigerant having flowed through the first cooling section and the liquid refrigerant having flowed through the second cooling section with each other,
wherein the junction part is insulated as the insulation target from the metal housing.

10. The projector according to claim 7, further comprising:
a heat exchanger disposed inside the metal housing, the heat exchanger adapted to transfer heat of a gas inside the metal housing to the liquid refrigerant flowing inside to cool the gas,
wherein the heat exchanger is insulated as the insulation target from the metal housing.

11. The projector according to claim 7,
wherein a first insulating member is disposed between the metal housing and the insulation target through which the liquid refrigerant flows, the insulation target insulated from the metal housing.

12. The projector according to claim 7,
wherein the insulation target is attached to the metal housing with an attachment member, and
wherein a second insulating member is disposed between the attachment member and the insulation target.

13. The projector according to claim 7,
wherein the metal housing has a positioning projection adapted to position the insulation target,
wherein the insulation target has a positioning hole through which the positioning projection is inserted, and
wherein a third insulating member is disposed between the positioning projection and an inner surface of the positioning hole.

* * * * *